(12) United States Patent
Toyama

(10) Patent No.: US 8,194,329 B2
(45) Date of Patent: Jun. 5, 2012

(54) VARIABLE MAGNIFICATION OPTICAL SYSTEM AND IMAGING APPARATUS

(75) Inventor: Nobuaki Toyama, Saitama (JP)

(73) Assignee: Fujifilm Corporation, Tokyo (JP)

( * ) Notice: Subject to any disclaimer, the term of this patent is extended or adjusted under 35 U.S.C. 154(b) by 72 days.

(21) Appl. No.: 12/951,105

(22) Filed: Nov. 22, 2010

(65) Prior Publication Data
US 2011/0128632 A1 Jun. 2, 2011

(30) Foreign Application Priority Data

Nov. 27, 2009 (JP) .................................. 2009-269915

(51) Int. Cl.
*G02B 15/14* (2006.01)
(52) U.S. Cl. ........ 359/682; 359/680; 359/691; 359/717; 359/740; 359/793
(58) Field of Classification Search .................. 359/680, 359/682, 691, 717, 740, 793
See application file for complete search history.

(56) References Cited

U.S. PATENT DOCUMENTS

| 7,050,240 B2 | 5/2006 | Tomioka | |
|---|---|---|---|
| 7,167,318 B2 | 1/2007 | Tomioka | |
| 7,545,581 B2 * | 6/2009 | Kawakami et al. | 359/689 |
| 2008/0019021 A1 * | 1/2008 | Kawakami et al. | 359/691 |

* cited by examiner

*Primary Examiner* — Evelyn A. Lester
(74) *Attorney, Agent, or Firm* — Young & Thompson

(57) ABSTRACT

A variable magnification optical system includes first lens group having negative refractive-power, an aperture-stop and second lens group having positive refractive-power, arranged from the object-side. A negative lens having a concave surface facing the image-side is arranged on the most object side of the first lens group, and an aspheric lens having a concave surface facing the object-side and an aspheric surface facing the image-side is arranged on the most image side of the first lens group. A positive lens having a convex surface facing the image-side is arranged, on the object-side of the aspheric lens, immediately before the aspheric lens. The image-side surface of the aspheric lens at the most image side of the first lens group includes a portion having higher positive power on the outside of positions through which outermost rays of an axial beam pass, compared with the vicinity of the optical axis.

7 Claims, 31 Drawing Sheets

FIG.4
EXAMPLE 1
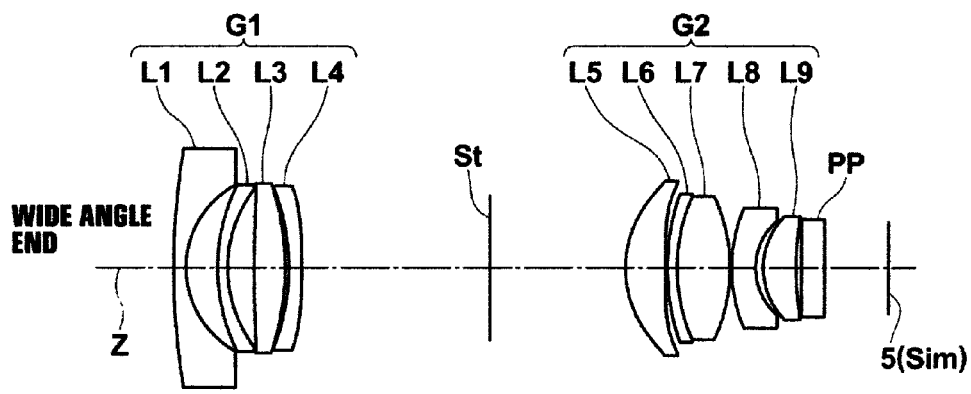
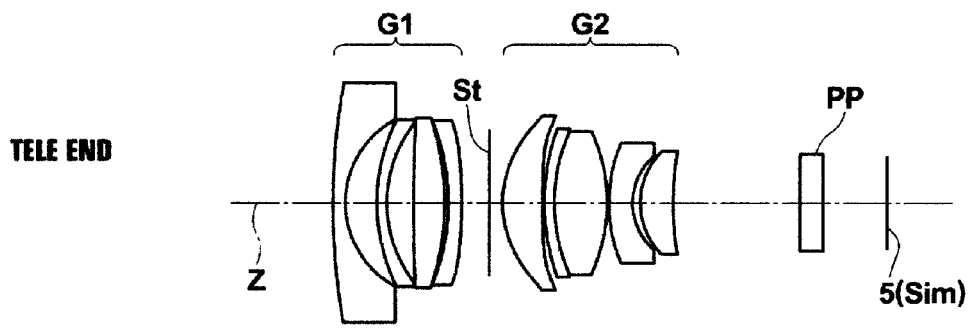

FIG.5
EXAMPLE 2
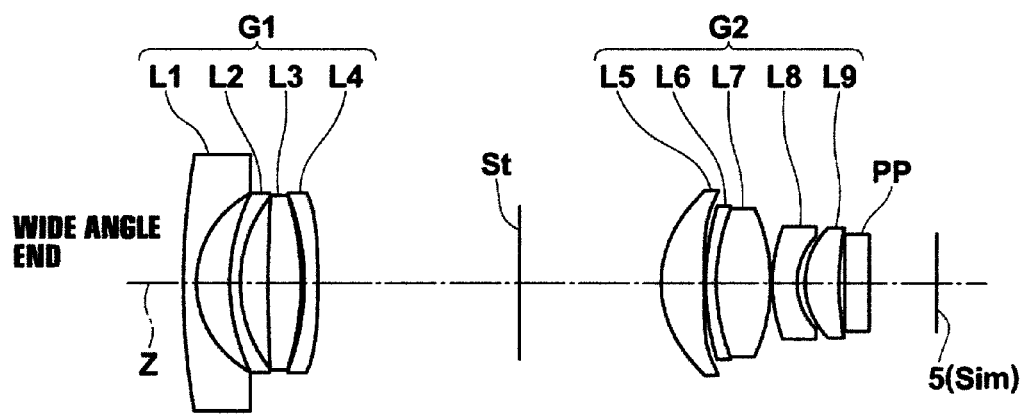
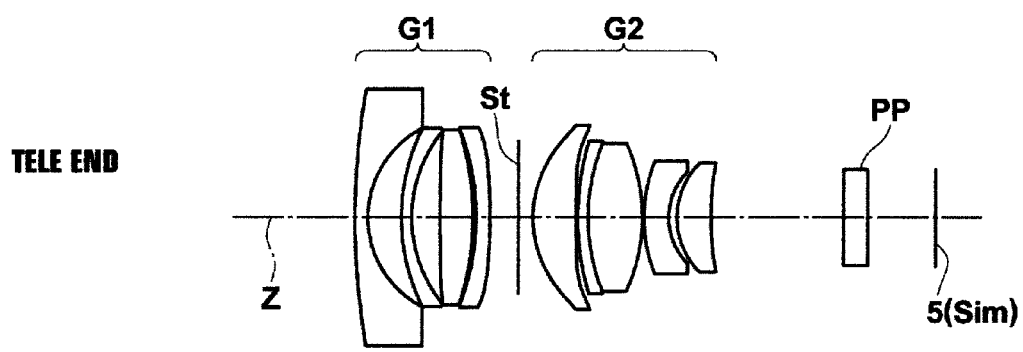

FIG.6
EXAMPLE 3
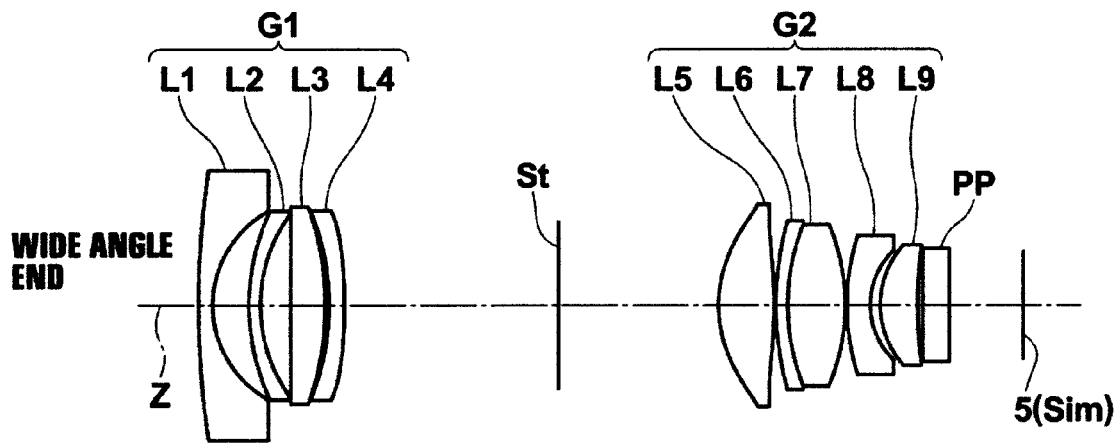
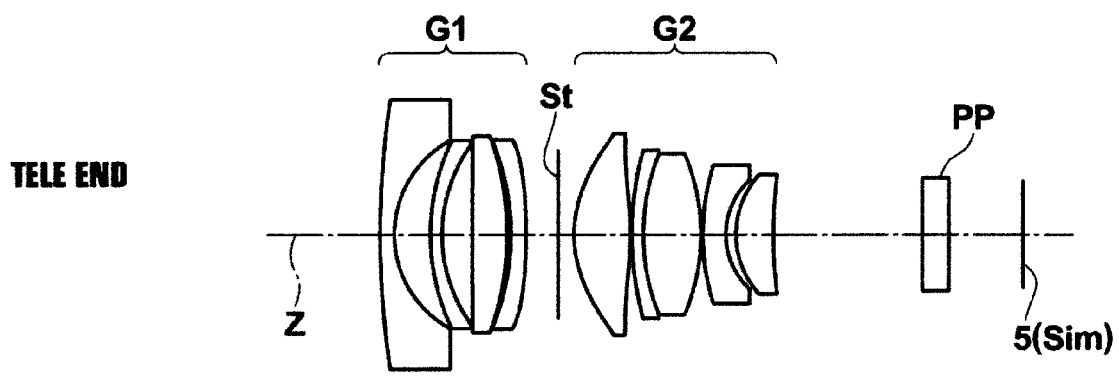

FIG.7
EXAMPLE 4
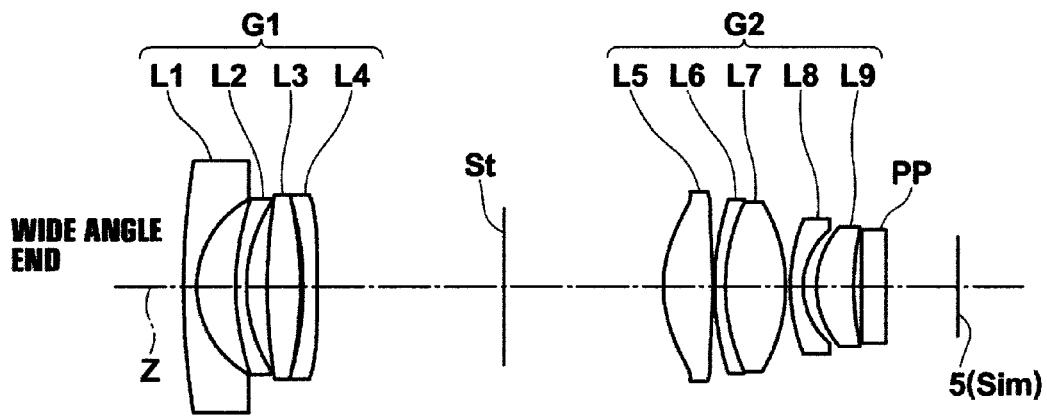
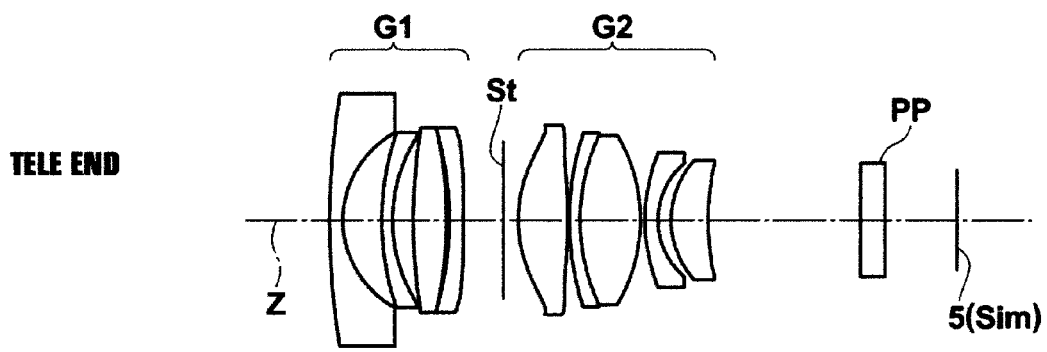

FIG.8
EXAMPLE 5
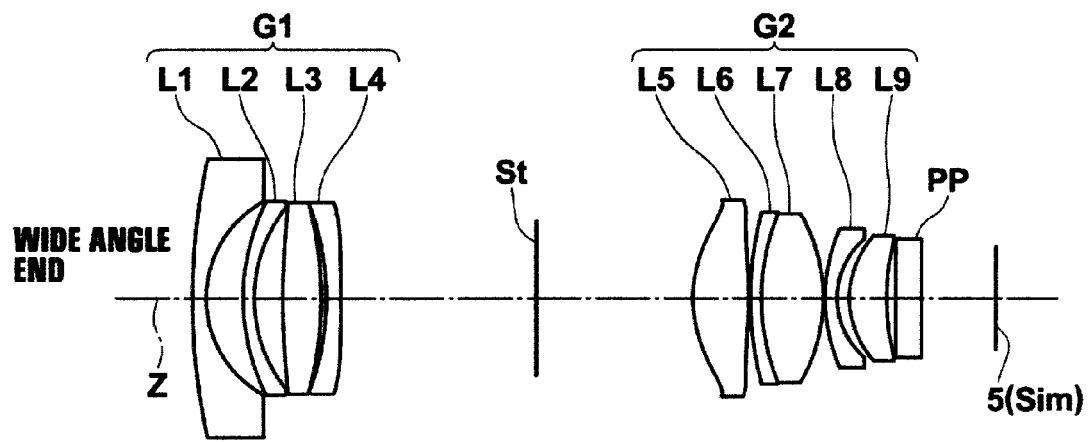
WIDE ANGLE END
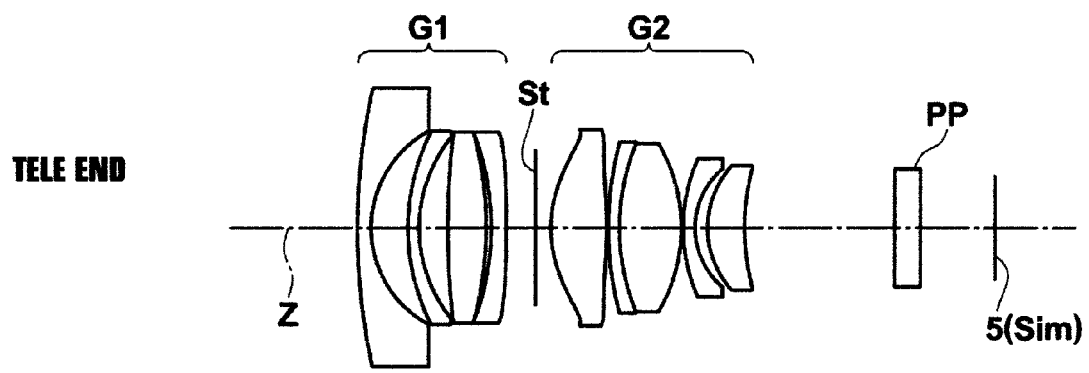
TELE END

FIG.9
EXAMPLE 6
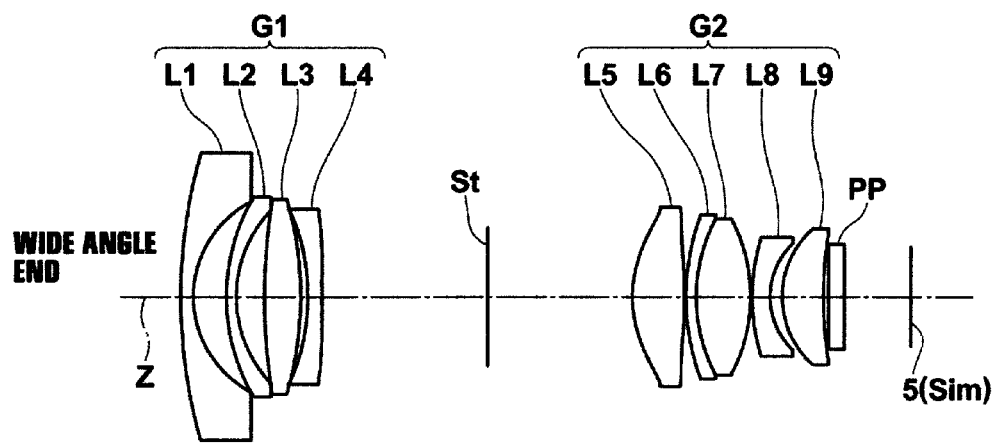
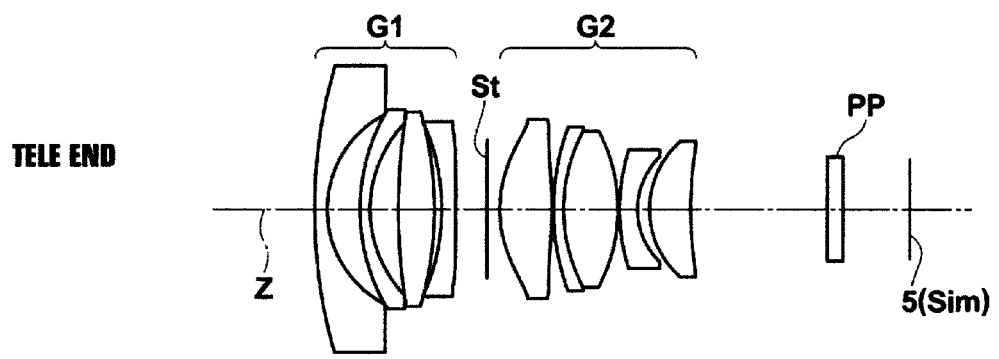

FIG.10
EXAMPLE 7
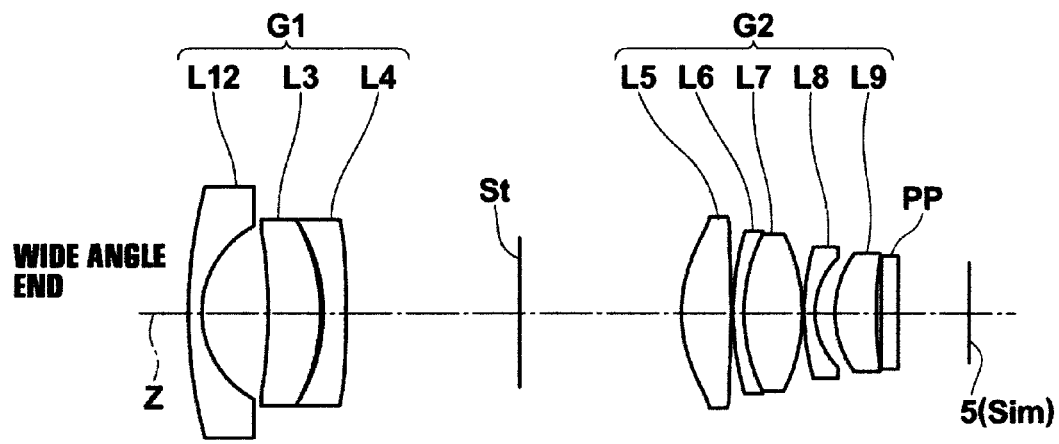
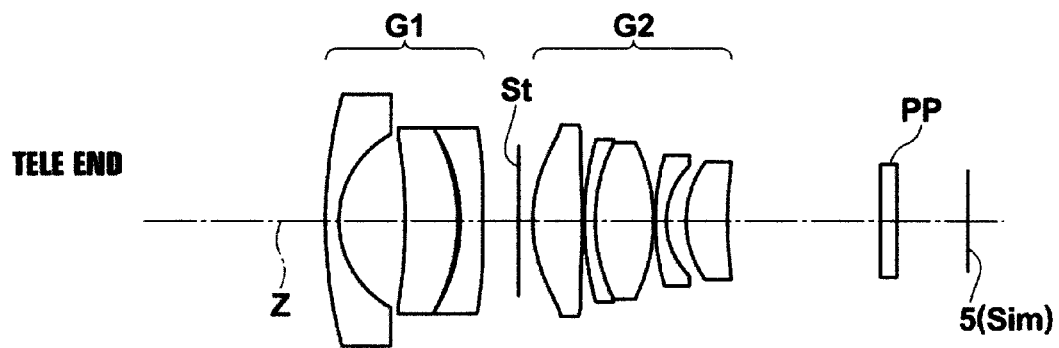

EXAMPLE 1

WIDE ANGLE END

TELE END

EXAMPLE 1 (WIDE ANGLE END)
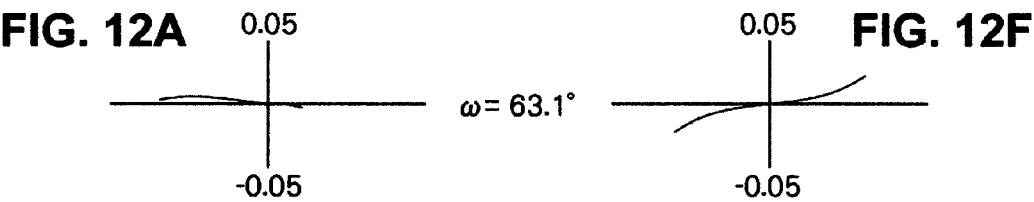
FIG. 12A    FIG. 12F    ω = 63.1°
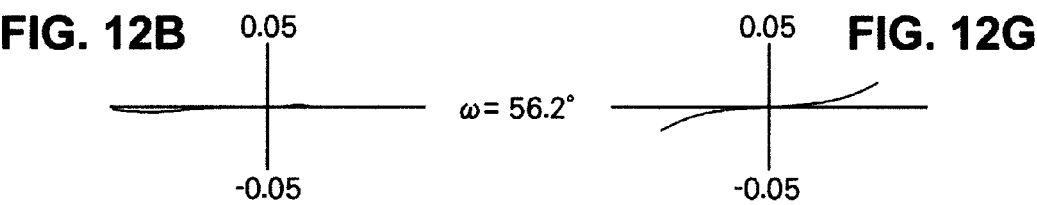
FIG. 12B    FIG. 12G    ω = 56.2°
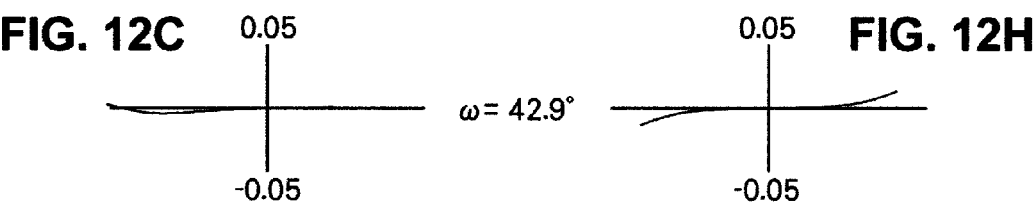
FIG. 12C    FIG. 12H    ω = 42.9°
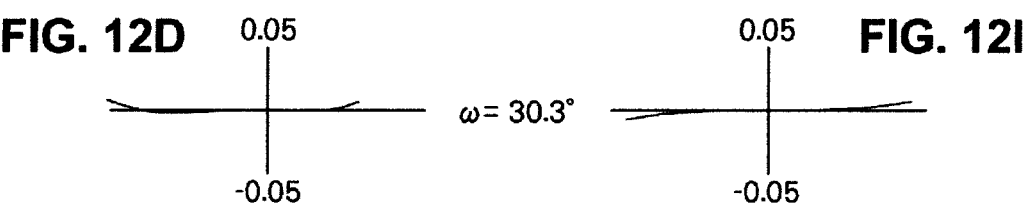
FIG. 12D    FIG. 12I    ω = 30.3°
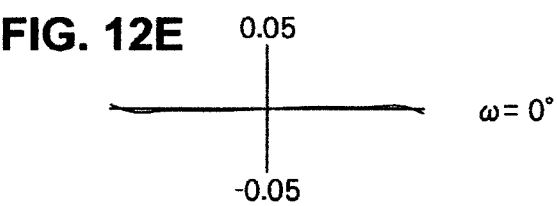
FIG. 12E    ω = 0°

EXAMPLE 1 (TELE END)

ω= 17.2°

ω= 15.5°

ω= 12.1°

ω= 8.6°

ω= 0°

EXAMPLE 2

WIDE ANGLE END

TELE END

EXAMPLE 2 (WIDE ANGLE END)
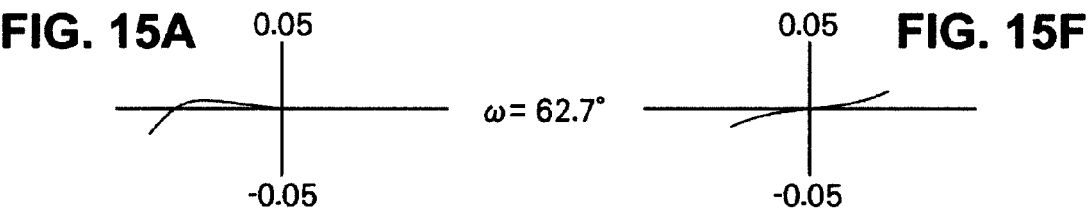
FIG. 15A  ω= 62.7°  FIG. 15F
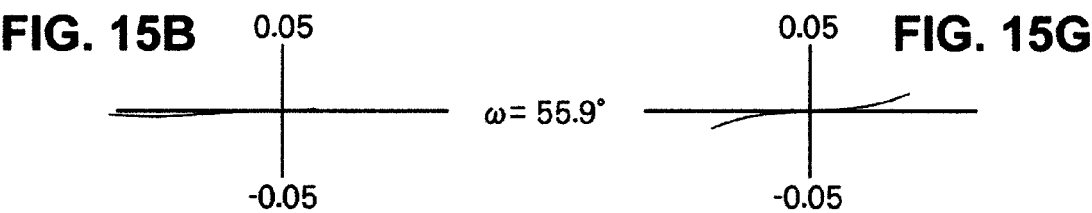
FIG. 15B  ω= 55.9°  FIG. 15G
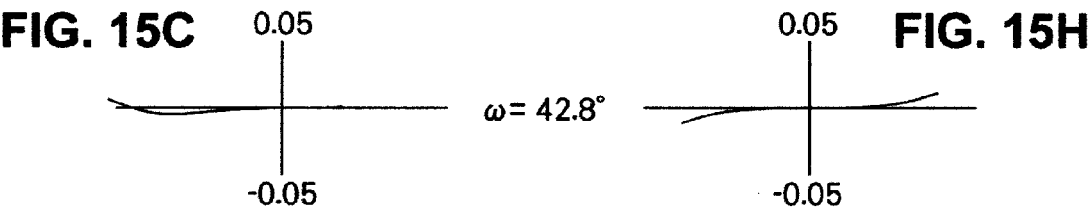
FIG. 15C  ω= 42.8°  FIG. 15H
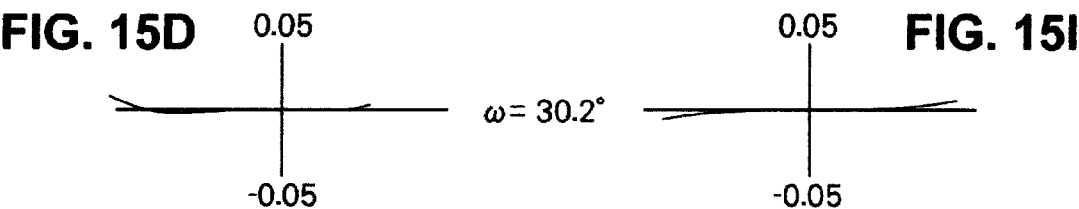
FIG. 15D  ω= 30.2°  FIG. 15I
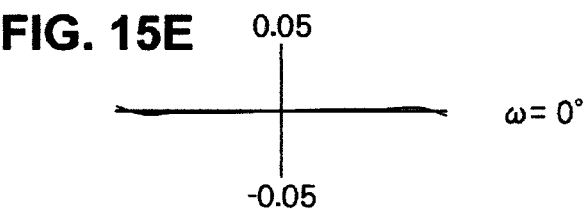
FIG. 15E  ω= 0°

EXAMPLE 2 (TELE END)
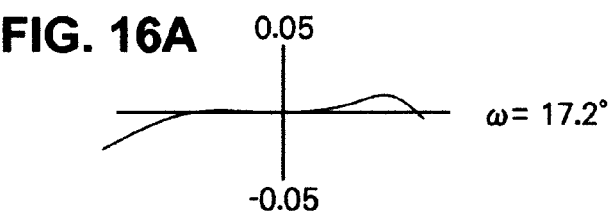
FIG. 16A  ω= 17.2°
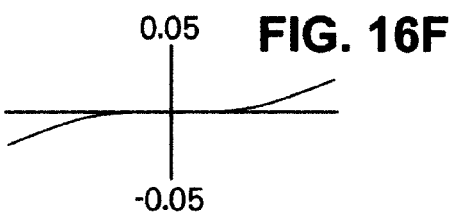
FIG. 16F
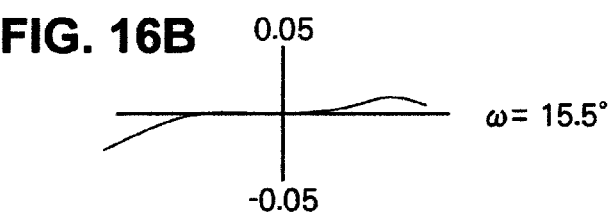
FIG. 16B  ω= 15.5°
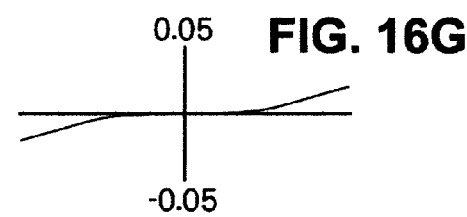
FIG. 16G
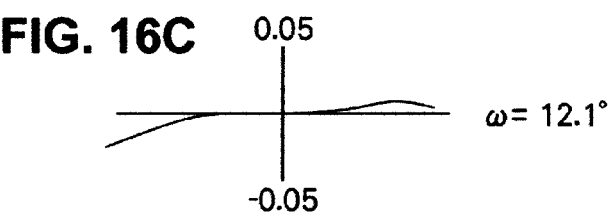
FIG. 16C  ω= 12.1°
FIG. 16H
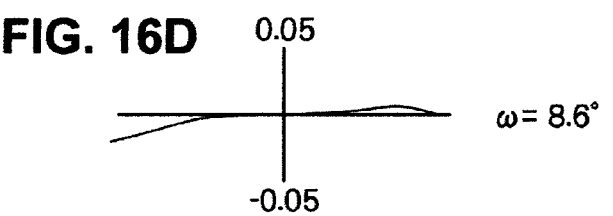
FIG. 16D  ω= 8.6°
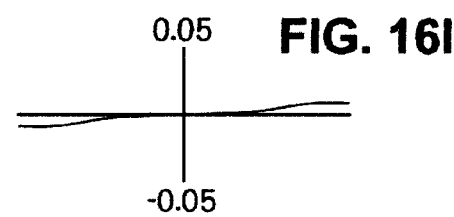
FIG. 16I
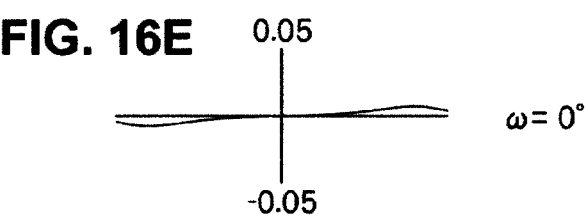
FIG. 16E  ω= 0°

EXAMPLE 3

WIDE ANGLE END

TELE END

EXAMPLE 3 (WIDE ANGLE END)

ω = 63.3°

ω = 56.3°

ω = 43°

ω = 30.3°

ω = 0°

EXAMPLE 3 (TELE END)

ω = 17.2°

ω = 15.5°

ω = 12.1°

ω = 8.7°

ω = 0°

EXAMPLE 4

WIDE ANGLE END

TELE END

EXAMPLE 4 (WIDE ANGLE END)
FIG. 21A 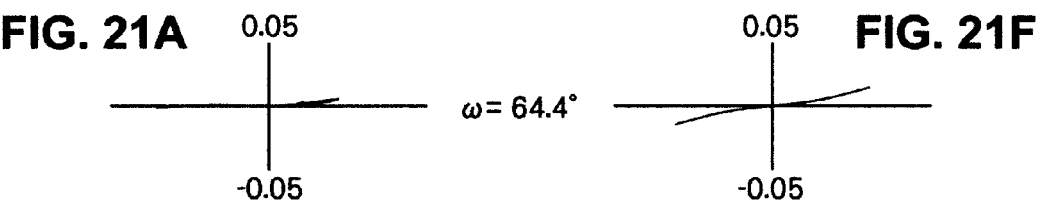 FIG. 21F
ω = 64.4°
FIG. 21B
ω = 57°
FIG. 21G
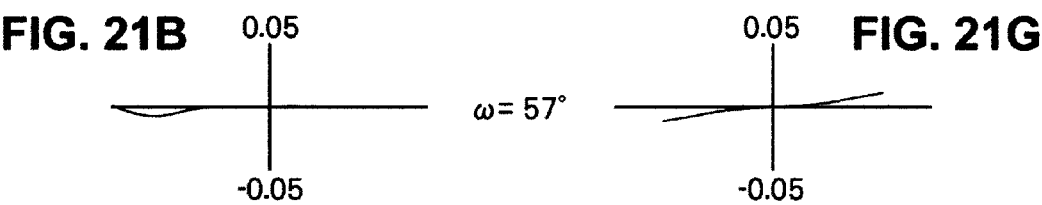
FIG. 21C 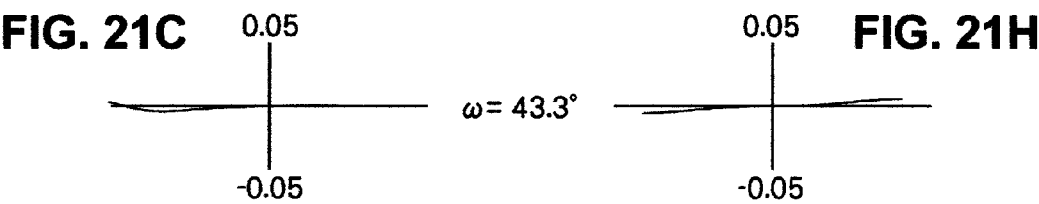 FIG. 21H
ω = 43.3°
FIG. 21D 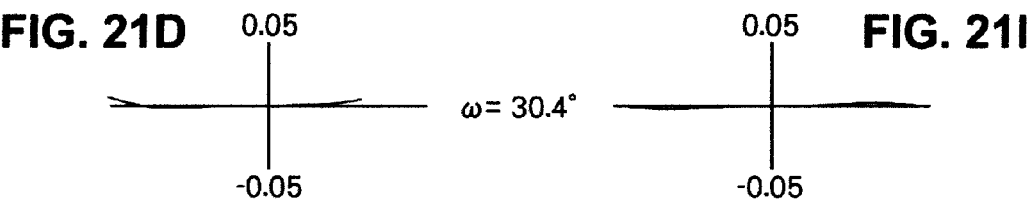 FIG. 21I
ω = 30.4°

ω = 0°

EXAMPLE 4 (TELE END)
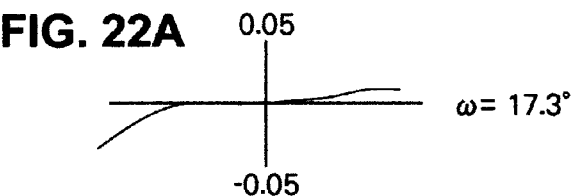
FIG. 22A  ω= 17.3°
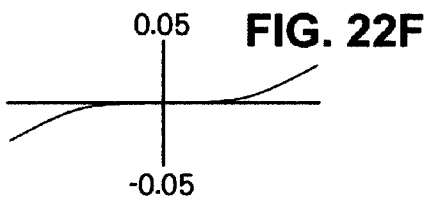
FIG. 22F
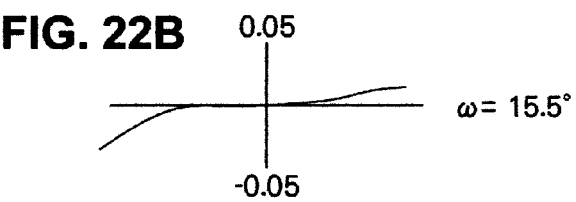
FIG. 22B  ω= 15.5°
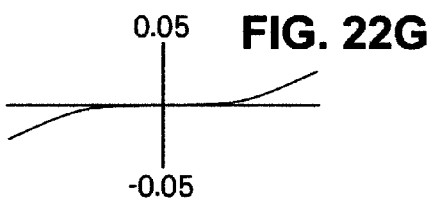
FIG. 22G
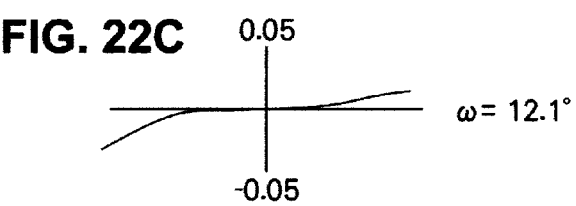
FIG. 22C  ω= 12.1°
FIG. 22H
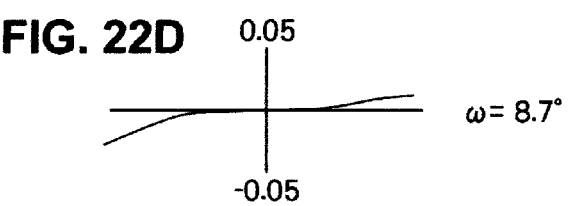
FIG. 22D  ω= 8.7°
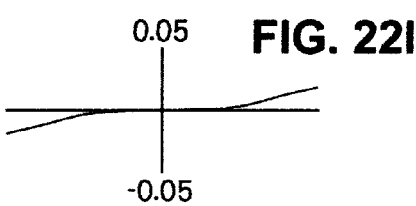
FIG. 22I
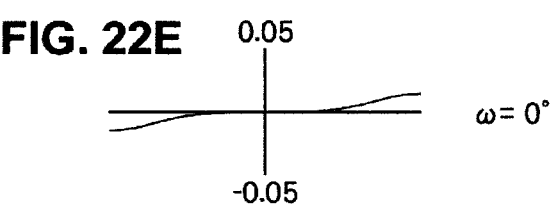
FIG. 22E  ω= 0°

EXAMPLE 5

WIDE ANGLE END

TELE END

EXAMPLE 5 (WIDE ANGLE END)
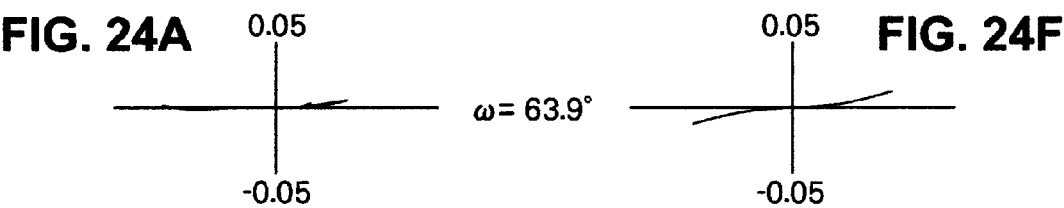
FIG. 24A / FIG. 24F  ω= 63.9°
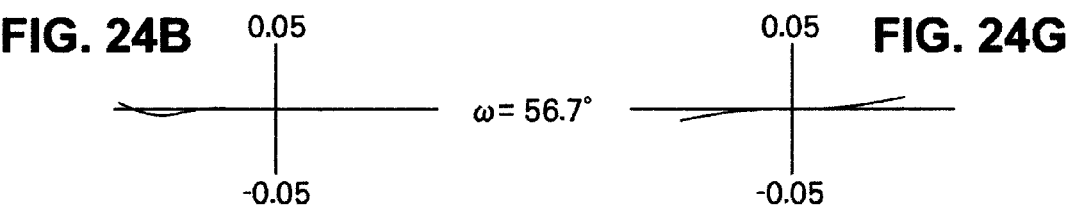
FIG. 24B / FIG. 24G  ω= 56.7°
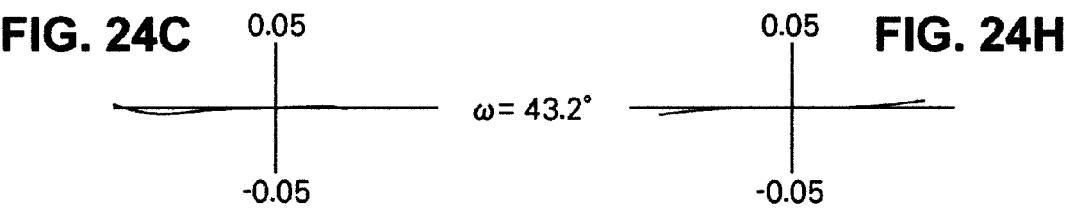
FIG. 24C / FIG. 24H  ω= 43.2°
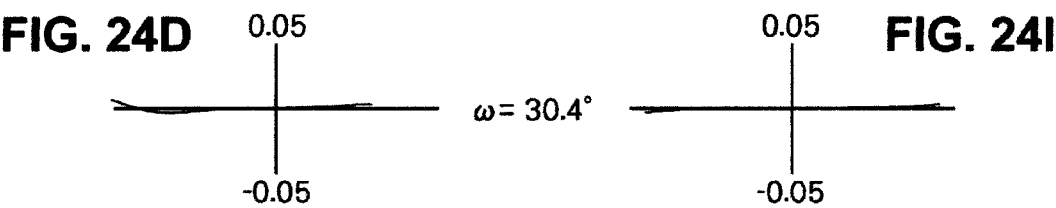
FIG. 24D / FIG. 24I  ω= 30.4°
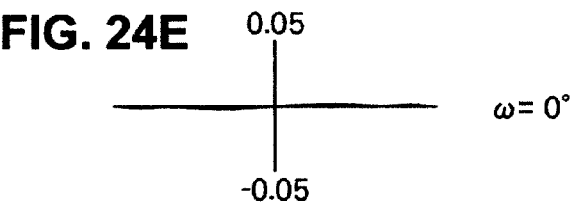
FIG. 24E  ω= 0°

EXAMPLE 5 (TELE END)

EXAMPLE 6

WIDE ANGLE END

TELE END

EXAMPLE 6 (WIDE ANGLE END)
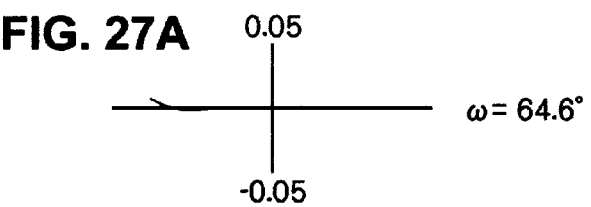
FIG. 27A  ω= 64.6°  FIG. 27F
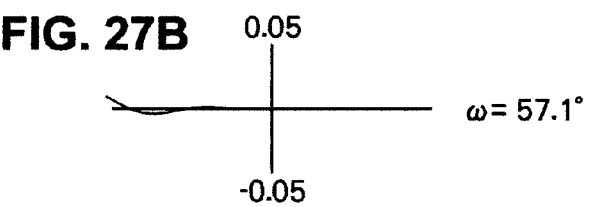
FIG. 27B  ω= 57.1°  FIG. 27G
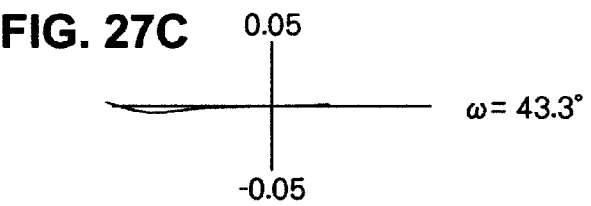
FIG. 27C  ω= 43.3°  FIG. 27H
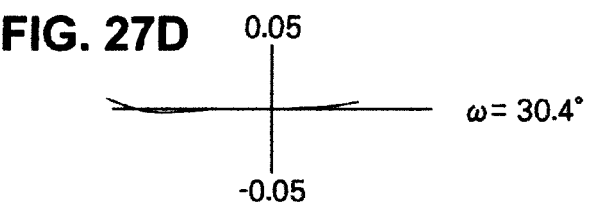
FIG. 27D  ω= 30.4°  FIG. 27I
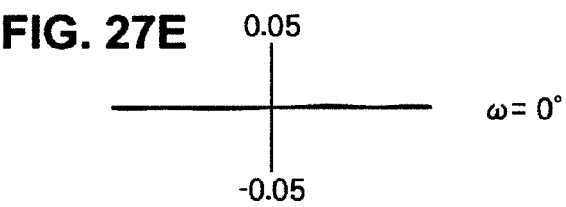
FIG. 27E  ω= 0°

EXAMPLE 6 (TELE END)

ω= 17.3°

ω= 15.5°

ω= 12.1°

ω= 8.7°

ω= 0°

EXAMPLE 7

EXAMPLE 7 (WIDE ANGLE END)
FIG. 30A 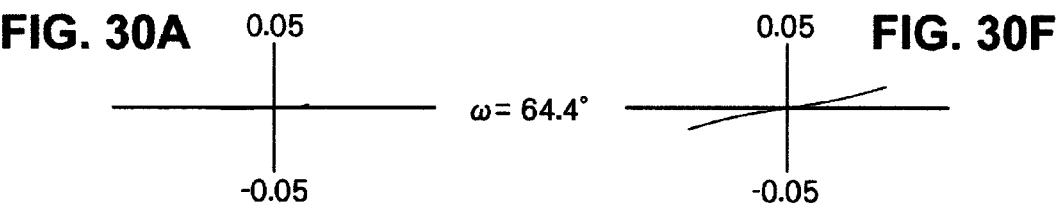 FIG. 30F
ω = 64.4°
FIG. 30B 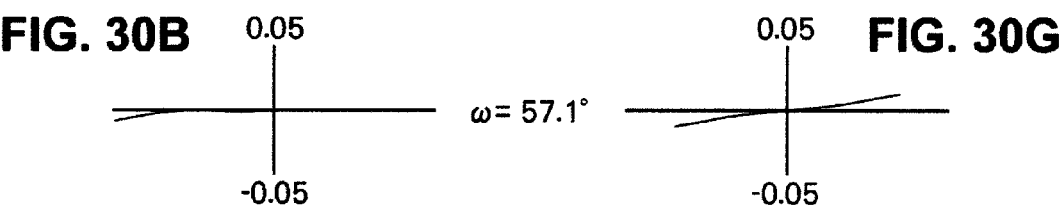 FIG. 30G
ω = 57.1°
FIG. 30C 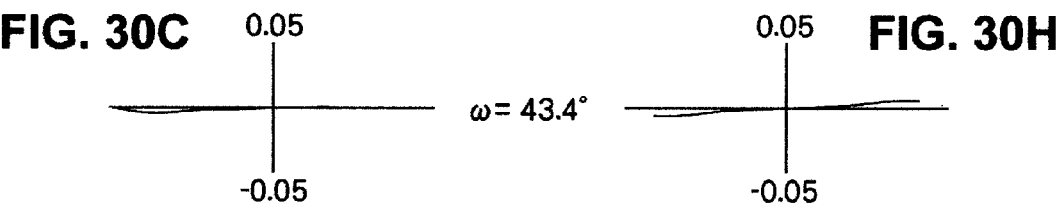 FIG. 30H
ω = 43.4°
FIG. 30D 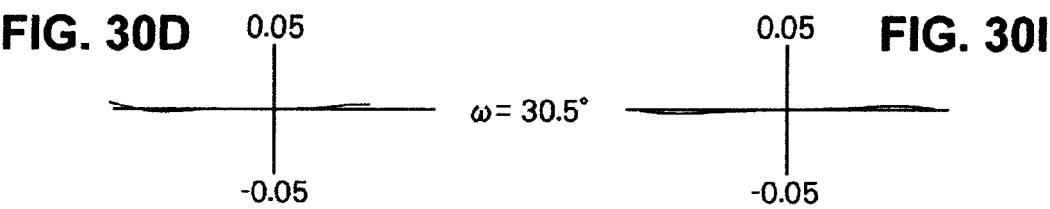 FIG. 30I
ω = 30.5°

ω = 0°

EXAMPLE 7 (TELE END)
FIG. 31A 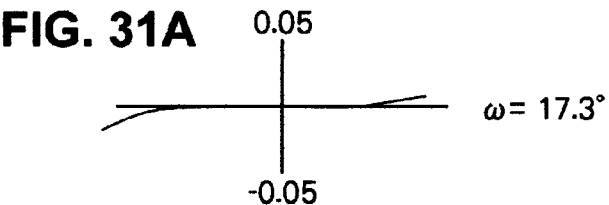 ω= 17.3° 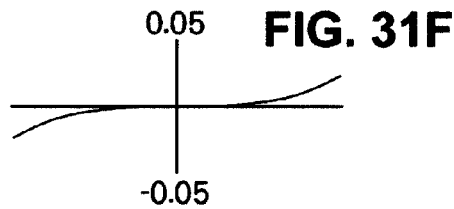 FIG. 31F
FIG. 31B 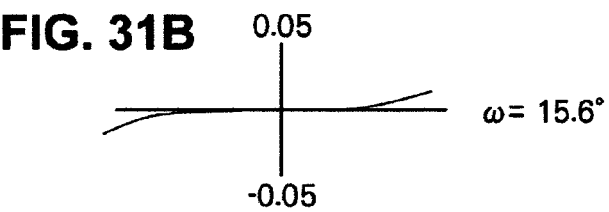 ω= 15.6° 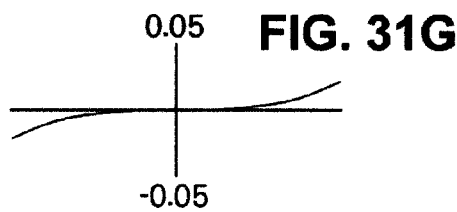 FIG. 31G
FIG. 31C 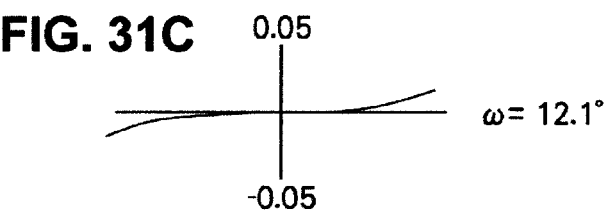 ω= 12.1° 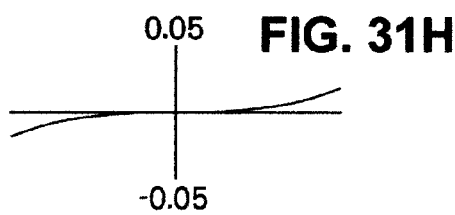 FIG. 31H
FIG. 31D 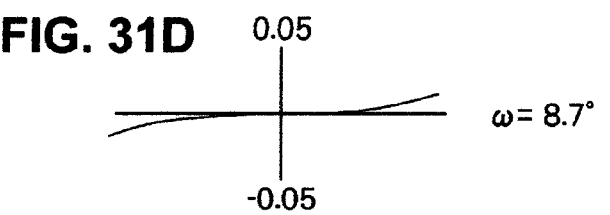 ω= 8.7° 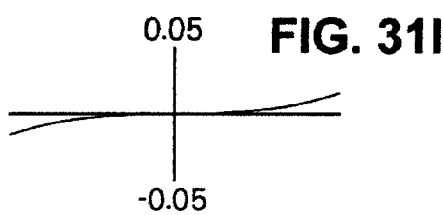 FIG. 31I
  ω= 0°

VARIABLE MAGNIFICATION OPTICAL SYSTEM AND IMAGING APPARATUS

BACKGROUND OF THE INVENTION

1. Field of the Invention

The present invention relates to a variable magnification optical system and an imaging apparatus. In particular, the present invention relates to a variable magnification optical system that is usable in a video camera, an electronic still camera, and the like, and which is appropriate especially for use in a monitor camera. Further, the present invention relates to an imaging apparatus including the variable magnification optical system.

2. Description of the Related Art

Conventionally, monitor cameras are used to prevent crimes, to record images, or the like. Optical systems for the monitor cameras need to be small and at low cost. The optical systems need to have large aperture ratios so that subjects are identified even in low-illumination photography conditions, as well as having high optical performance. Further, a demand for monitor cameras with variable magnification functions increased in recent years. Naturally, the main trend of optical systems for monitor cameras will be variable magnification optical systems. The variable magnification optical systems that can be used in monitor cameras are disclosed, for example, in U.S. Pat. No. 7,167,318 (Patent Document 1) and U.S. Pat. No. 7,050,240 (Patent Document 2). The variable magnification optical systems disclosed in Patent Document 1 and Patent Document 2 are two-group zoom optical systems, each composed of a first lens group having a negative refractive power and a second lens group having a positive refractive power. The variable magnification optical systems disclosed in Patent Documents 1 and 2 are six-lens or eight-lens optical systems as a whole, and all lenses in the first lens group are aspheric lenses.

Meanwhile, imaging devices, such as a CCD (Charge Coupled Device) and a CMOS (Complementary Metal Oxide Semiconductor), are mounted on cameras in the aforementioned fields. In recent years, the resolution of the imaging devices became higher, and a demand for high-quality images or video images by use of monitor cameras increased. Especially, a demand for high-performance variable magnification optical systems that can cope with imaging devices having pixel numbers of 1 million or higher is increasing. However, in conventional optical systems, it was difficult to achieve high-performance optical systems that can cope with the increase in resolution in recent years, while the large aperture ratio and the compactness, which are necessary for use in monitor cameras, are maintained.

SUMMARY OF THE INVENTION

In view of the foregoing circumstances, it is an object of the present invention to provide a variable magnification optical system having a high optical performance that can cope with the increase of resolution in recent years, while the large aperture ratio and the compactness of the optical system are maintained. Further, it is another object of the present invention to provide an imaging apparatus including the variable magnification optical system.

A variable magnification optical system of the present invention is a variable magnification optical system comprising:

a first lens group having negative refractive power;
an aperture stop; and
a second lens group having positive refractive power, which are arranged from the object side of the variable magnification optical system, wherein the magnification of the variable magnification optical system is changed by changing an interval between the first lens group and the second lens group in the direction of an optical axis, and the position of an image plane is corrected by moving the first lens group in the direction of the optical axis when correction of the position of the image plane becomes necessary by changing the magnification, and wherein a negative lens having a concave surface facing the image side of the variable magnification optical system is arranged on the most object side of the first lens group, and an aspheric lens having a concave surface facing the object side and an aspheric surface facing the image side is arranged on the most image side of the first lens group, and a positive lens having a convex surface facing the image side is arranged, on the object side of the aspheric lens, immediately before the aspheric lens, and wherein the image-side surface of the aspheric lens includes a portion having higher positive power on the outside of positions through which outermost rays of an axial beam pass, compared with power in a region of the surface of the aspheric lens in the vicinity of the optical axis.

The expression "a positive lens having a convex surface facing the image side is arranged, on the object side of the aspheric lens, immediately before the aspheric lens" means that no optical element is present between the aspheric lens and the positive lens having the convex surface facing the image side.

Further, the expressions "a negative lens having a concave surface facing the image side", "having a concave surface facing the object side", and "a positive lens having a convex surface facing the image side" refer to paraxial regions of the lenses when the lenses are aspheric lenses.

Further, the term "axial beam" refers to the axial beam when a light beam enters the maximum aperture based on the specification of the optical system. Further, the term "outermost rays of an axial beam" refers to rays that are included in the axial beam and farthest from the optical axis in the direction perpendicular to the optical axis.

Further, power at a point on a surface may be represented by $(N2-N1)/R$, when the length of a segment connecting the point and an intersection between the normal to the surface at the point and the optical axis (the intersection, at which the normal to the surface at the point and the optical axis intersect each other) is curvature radius R, and the refractive index of the object side of the surface is N1, and the refractive index of the image side of the surface is N2. At this time, the sign of the curvature radius R (positive or negative) is positive when the intersection is located on the image side of the surface. The curvature radius R is negative when the intersection is located on the object side of the surface.

Further, the expression "having higher positive power . . . , compared with . . . the vicinity of the optical axis" refers not only to the case of having positive power in the vicinity of the optical axis and higher positive power on the outside of positions through which outermost rays of an axial beam pass, but also to the case of having negative or zero power in the vicinity of the optical axis and positive power on the outside of positions through which outermost rays of the axial beam pass.

The expression "the outside of positions through which outermost rays of the axial beam pass" refers to a region within an effective diameter. Therefore, a region on the outside of the effective diameter is not included.

In the present invention, the "effective diameter" of a surface is determined by the height of outermost rays of rays included in an axial beam and an off-axial beam, when the axial beam and the off-axial beam enter the maximum aperture based on the specification of the optical system. The specification is an F-number, the angle of view, the image height, and the like. Further, the specification may include the aperture of a diaphragm that cuts predetermined rays.

In the variable magnification optical system of the present invention, when the refractive index of the aspheric lens in the first group for e-line is Ne4, it is desirable that the following formula (1) is satisfied:

$$Ne4 > 1.75 \quad (1).$$

In the variable magnification optical system of the present invention, it is desirable that the first lens group is a four-lens lens group composed of:

a negative lens having a concave surface facing the image side;

a negative lens having a concave surface facing the image side;

a positive lens having a convex surface facing the image side; and an aspheric lens having a concave surface facing the object side and an aspheric surface facing the image side, which are sequentially arranged from the object side.

In the variable magnification optical system of the present invention, it is desirable that the aperture stop is fixed when the magnification is changed.

In the variable magnification optical system of the present invention, when the paraxial curvature radius of the image side surface of the positive lens of the first lens group is Ra, and the paraxial curvature radius of the object side surface of the aspheric lens of the first lens group is Rb, it is desirable that the following formula (2) is satisfied:

$$(Ra+Rb)/(Ra-Rb) > 4.5 \quad (2).$$

The signs of Ra and Rb are positive when surfaces are convex toward the object side, and negative when surfaces are convex toward the image side.

In the variable magnification optical system of the present invention, it is desirable that the following formulas (3) and (4) are satisfied with respect to the image side surface of the aspheric lens of the first lens group:

$$sag10 - sag7 < 0 \quad (3); \text{ and}$$

$$sag10/sag7 > 2.5 \quad (4), \text{ where}$$

sag10: a distance, in the direction of the optical axis, from a point at an outermost position of an effective diameter of the image side surface of the aspheric lens of the first lens group to a plane that passes an intersection between the image side surface of the aspheric lens and the optical axis and is perpendicular to the optical axis, when the variable magnification optical system is set at wide angle end, and sag7: a distance, in the direction of the optical axis, from a point on the image side surface of the aspheric lens, the distance of which from the optical axis is 70% of that of the outermost position of the effective diameter, to the plane that passes the intersection between the image side surface of the aspheric lens and the optical axis and is perpendicular to the optical axis, when the variable magnification optical system is set at wide angle end.

The signs of sag10 and sag7 are positive when the point at the outermost position of the effective diameter and the point on the lens surface, the distance of which from the optical axis is 70% of that of the outermost position of the effective diameter, are located respectively on the image side of the plane that passes the intersection between the image side surface of the aspheric lens and the optical axis, and is perpendicular to the optical axis. The signs of sag10 and sag7 are negative when the points are located respectively on the object side of the plane.

An imaging apparatus of the present invention is an imaging apparatus comprising the variable magnification optical system of the present invention as described above.

According to the present invention, a variable magnification optical system is composed of a first lens group having negative refractive power, an aperture stop, and a second lens group having positive refractive power, which are sequentially arranged from the object side of the variable magnification optical system. Further, the magnification of the variable magnification optical system is changed by changing an interval between the first lens group and the second lens group in the direction of an optical axis, and the position of an image plane is corrected by moving the first lens group in the direction of the optical axis when correction of the position of the image plane becomes necessary by changing the magnification. In the variable magnification optical system, the first lens group is set in an appropriate manner. In particular, an aspheric lens is arranged on the most image side of the first lens group (closest to the image side among lenses of the first lens group), and the form of the aspheric lens is appropriately set. Therefore, it is possible to realize a variable magnification optical system that has high optical performance to cope with the increase of resolution in recent years, while the compactness and the large aperture ratio are maintained.

Further, the imaging apparatus of the present invention includes the variable modification optical system of the present invention. Therefore, the imaging apparatus has excellent compactness, and can perform photography (imaging) at low illumination. Further, it is possible to obtain high-quality images.

BRIEF DESCRIPTION OF THE DRAWINGS

FIG. 4 is a cross-section illustrating the lens structure of a variable magnification optical system in Example 1 of the present invention;

FIG. 5 is a cross-section illustrating the lens structure of a variable magnification optical system in Example 2 of the present invention;

FIG. 6 is a cross-section illustrating the lens structure of a variable magnification optical system in Example 3 of the present invention;

FIG. 7 is a cross-section illustrating the lens structure of a variable magnification optical system in Example 4 of the present invention;

FIG. 8 is a cross-section illustrating the lens structure of a variable magnification optical system in Example 5 of the present invention;

FIG. 9 is a cross-section illustrating the lens structure of a variable magnification optical system in Example 6 of the present invention;

FIG. 10 is a cross-section illustrating the lens structure of a variable magnification optical system in Example 7 of the present invention;

FIGS. 12A through 12I are diagrams illustrating lateral aberrations of the variable magnification optical system in Example 1 of the present invention at wide angle end;

FIGS. 15A through 15I are diagrams illustrating lateral aberrations of the variable magnification optical system in Example 2 of the present invention at wide angle end;

FIGS. 16A through 16I are diagrams illustrating lateral aberrations of the variable magnification optical system in Example 2 of the present invention at tele end;

FIGS. 21A through 21I are diagrams illustrating lateral aberrations of the variable magnification optical system in Example 4 of the present invention at wide angle end;

FIGS. 22A through 22I are diagrams illustrating lateral aberrations of the variable magnification optical system in Example 4 of the present invention at tele end;

FIGS. 24A through 24I are diagrams illustrating lateral aberrations of the variable magnification optical system in Example 5 of the present invention at wide angle end;

FIGS. 27A through 27I are diagrams illustrating lateral aberrations of the variable magnification optical system in Example 6 of the present invention at wide angle end;

FIGS. 30A through 30I are diagrams illustrating lateral aberrations of the variable magnification optical system in Example 7 of the present invention at wide angle end;

FIGS. 31A through 31I are diagrams illustrating lateral aberrations of the variable magnification optical system in Example 7 of the present invention at tele end.

DESCRIPTION OF THE PREFERRED EMBODIMENTS

Figure 1:
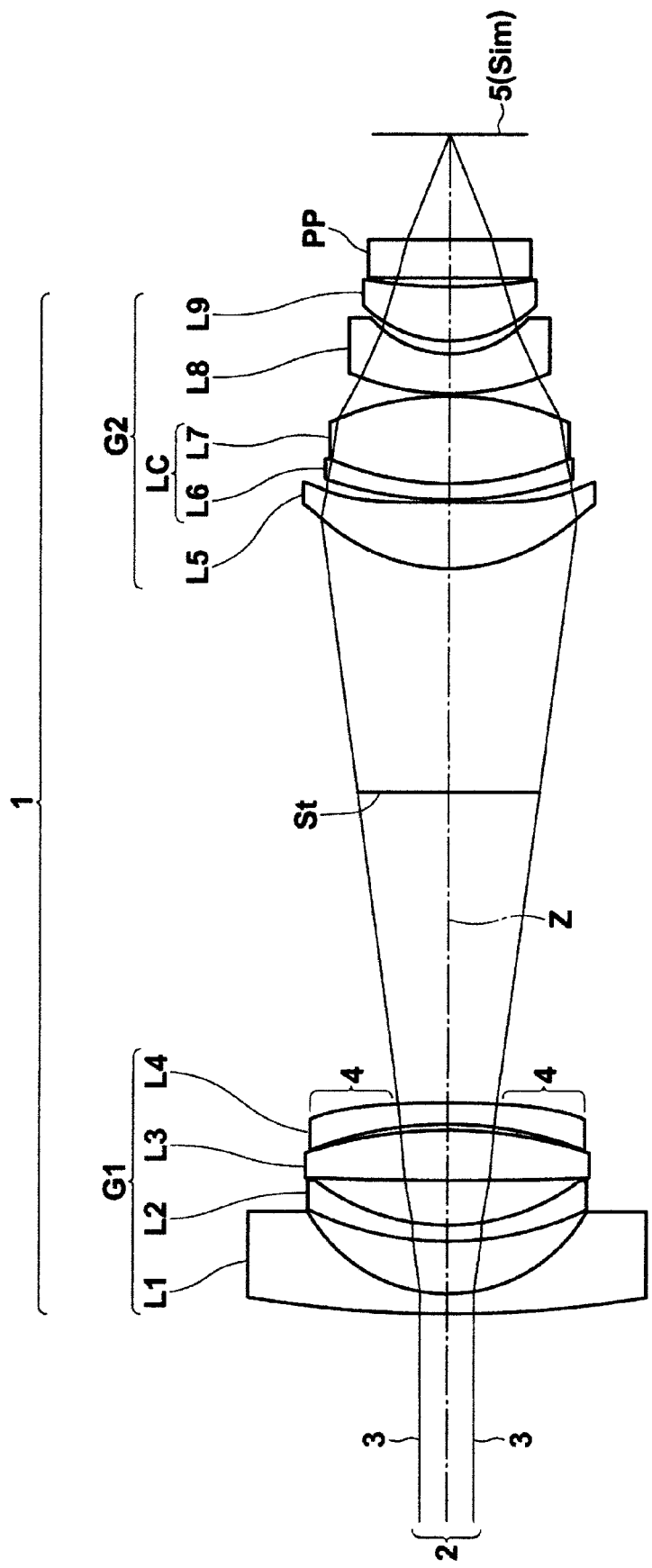
FIG. 1 is a cross-section illustrating the structure of a variable magnification optical system according to an embodiment of the present invention and an optical path of an axial beam.

Hereinafter, embodiments of the present invention will be described, in detail, with reference to drawings. FIG. 1 is a cross-section illustrating an example of the structure of a variable magnification optical system 1 according to an embodiment of the present invention. The variable magnification optical system 1 illustrated in FIG. 1 corresponds to the variable magnification optical system in Example 1, which will be described later. In FIG. 1, the left side is the object side, and the right side is the image side. FIG. 1 illustrates also an axial beam 2 from an object located at infinity.

The variable magnification optical system 1 is composed of first lens group G1 having negative refractive power, aperture stop St, and second lens group G2 having positive refractive power, which are arranged along optical axis Z from the object side of the variable magnification optical system. The magnification of the variable magnification optical system 1 is changed between a wide angle end and a tele end by changing an interval between the first lens group G1 and the second lens group G2 in the direction of an optical axis. Further, the position of an image plane is corrected by moving the first lens group G1 in the direction of the optical axis Z when correction of the position of the image plane becomes necessary by changing the magnification. In the example illustrated in FIG. 1, the aperture stop St is fixed when the magnification is changed. In FIG. 1, the aperture stop St does not necessarily represent the form nor the size of the aperture stop St, but the position of the aperture stop ST on the optical axis Z. When the first lens group has negative power, in other words, a lens group having negative power is located on the object side or leading side, the lens system is appropriate for realizing a wide angle of view. Further, it is relatively easy to maintain sufficient backfocus.

Considering a case of applying the variable magnification optical system 1 to an imaging apparatus, FIG. 1 illustrates an imaging device 5, which is arranged on image plane Sim of the variable magnification optical system. When the variable magnification optical system 1 is applied to the imaging apparatus, it is desirable that a cover glass, a prism, an infrared-ray cut filter, a low-pass filter, or the like is provided based on the structure of a camera onto which the lens is mounted. Therefore, FIG. 1 illustrates a case in which parallel-flat-plate-form optical member PP, which assumes these elements, is arranged between the second lens group G2 and the imaging device 5.

In the first lens group G1 of the variable magnification optical system 1, a negative lens having a concave surface facing the image side of the variable magnification optical system is arranged on the most object side of the first lens group G1. Further, an aspheric lens having a concave surface facing the object side and an aspheric surface facing the image side is arranged on the most image side of the first lens group G1. Further, a positive lens having a convex surface facing the image side is arranged, on the object side of the aspheric lens, immediately before the aspheric lens. Since the first lens group G1 has at least three lenses as described above, it is possible to reduce the size of the optical system and to reduce coma aberration and field curvature, thereby realizing a high performance variable magnification optical system.

When reduction of the size of the optical system is important, it is desirable that the first lens group G1 is composed of the three lenses.

When the resolution of the optical system needs to be increased further, the first lens group G1 may include more than three lenses. For example, the first lens group G1 illustrated in FIG. 1 is a four-lens lens group composed of negative lens L1 having a concave surface facing the image side, negative lens L2 having a concave surface facing the image side, positive lens L3 having a convex surface facing the image side, and negative lens L4 having a concave surface facing the object side and an aspheric surface facing the image side, which are sequentially arranged from the object side. When the first lens group G1 is composed of four lenses as described above, it is possible to suppress coma aberration and field curvature more effectively, compared with the three-lens lens group. Therefore, it is possible to realize high-performance variable magnification optical system having high resolution that can cope with a high-resolution imaging device.

Specifically, the first lens group G1 illustrated in FIG. 1 is composed of four lenses, namely, negative meniscus lens L1 having a convex surface facing the object side, negative meniscus lens L2 having a convex surface facing the object side, positive double-convex lens L3, and negative meniscus lens L4 having a convex surface facing the image side in the paraxial region. The two negative lenses are arranged on the most object side of the first lens group G1, as described above. Therefore, compared with the first lens group G1 composed of three lenses, it is possible to distribute the negative power necessary for the first lens group G1 to the two negative lenses. Further, the meniscus form of the two negative lenses is advantageous to correct aberrations, such as coma aberration and field curvature.

It is desirable that the aspheric lens L4 arranged on the most image side of the first lens group G1 of the variable magnification optical system 1 satisfies the following formula when the refractive index of the lens L4 is Ne4:

$$Ne4 > 1.75 \qquad (1).$$

It is possible to select a high refractive index material by satisfying the formula (1). Compared with a case in which a high refractive index material is not selected, it is possible to increase the absolute value of the curvature radius of the lens L4. Therefore, it is possible to more effectively suppress coma aberration.

It is desirable that the lens L4 having a concave surface facing the object side is arranged on the most image side of the first lens group G1 of the variable magnification optical system 1. Further, it is desirable that lens L3 having a convex surface facing the image side is arranged, next to the lens L4, at a second position from the imaging side of the first lens group G1. It is desirable that the lenses L3 and L4 are arranged close to each other, and a meniscus-form air lens having a convex surface facing the image side is formed between the lenses L3 and L4, as illustrated in FIG. 1.

When the paraxial curvature radius of the image side surface of the lens L3 is Ra, and the paraxial curvature radius of the object side surface of the lens L4 is Rb, it is desirable that the following formula (2) is satisfied:

$$(Ra+Rb)/(Ra-Rb) > 4.5 \qquad (2).$$

When the formula (2) is satisfied, it is possible to correct coma aberration and field curvature in an excellent manner. Therefore, it is possible to realize a high-performance optical system having high resolution.

It is more desirable that, instead of the formula (2), the following formula (2-2) is satisfied:

$$(Ra+Rb)/(Ra-Rb) > 4.8 \qquad (2\text{-}2).$$

When the formula (2-2) is satisfied, it is possible to achieve a higher advantageous effect, compared with the case of satisfying the formula (2).

In the variable magnification optical system 1, the image side surface of the lens L4 is formed in such a manner that a region 4 on the outside (the side that is away from the optical axis) of positions through which outermost rays 3 of an axial beam 2 pass includes an area (portion), the positive power of which is higher than power in the vicinity of the optical axis. Accordingly, it is possible to correct off-axis aberrations, and particularly, coma aberration in an excellent manner. Therefore, it is possible to realize a high-performance optical system that is small and has high resolution.

The image side surface of the lens L4 may be formed, for example, in such a manner that positive power increases from the optical axis toward the peripheral side. Alternatively, the image side surface of the lens L4 may be formed in such a manner that only a part of the region 4 has higher positive power than power in the vicinity of the optical axis.

Further, it is desirable that the image side surface of the lens L4 satisfies the following formulas (3) and (4):

$$sag10 - sag7 < 0 \qquad (3); \text{ and}$$

$$sag10/sag7 > 2.5 \qquad (4), \text{ where}$$

sag10: a distance, in the direction of the optical axis Z, from point P10 at an outermost position of an effective diameter of the image side surface of the lens L4 to plane H that passes intersection O between the image side surface of the lens L4 and the optical axis Z and is perpendicular to the optical axis Z, when the variable magnification optical system 1 is set at wide angle end, and sag7: a distance, in the direction of the optical axis Z, from point P7 on the image-side surface of the lens L4, the distance of which from the optical axis Z is 70% of that of the outermost position of the effective diameter of the image-side surface of the lens L4 to plane H that passes the intersection O between the image side surface of the lens L4 and the optical axis Z and is perpendicular to the optical axis Z, when the variable magnification optical system 1 is set at wide angle end.

Figure 2:
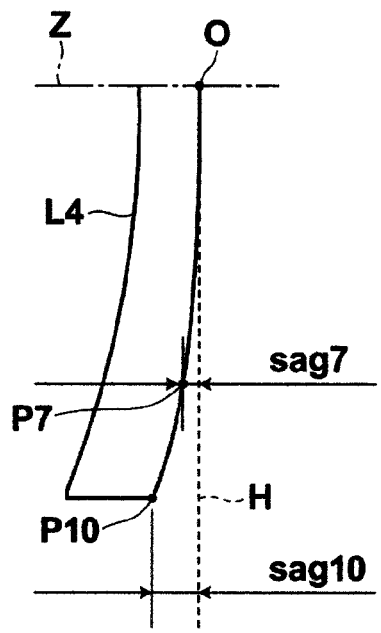
FIG. 2 is a partially enlarged diagram for explaining formulas (3) and (4)

FIG. 2 illustrates the sag10, sag7, point O, point P10, and point P7. FIG. 2 is a partially enlarged diagram illustrating the lower side of the optical axis Z in the cross-section of the lens L4. The distance, in the direction perpendicular to the optical axis Z, from the optical axis Z to the point P7 is 70% of the distance from the optical axis Z to the point P10. In the formulas (3) and (4), the signs of the values of sag10 and sag7 are positive when the point P10 and the point P7 are located respectively on the image side of the point O. The signs of sag10 and sag7 are negative when the point P10 and the point P7 are located respectively on the object side of the point O.

When the formulas (3) and (4) are satisfied, it is possible to correct off-axis aberrations, and particularly, coma aberration in an excellent manner. Therefore, it is possible to easily realize a high-performance optical system that is small and has high resolution.

Further, it is even more desirable that instead of the formula (3), the following formula (3-2) is satisfied:

$$sag10 - sag7 < -1.5 \qquad (3\text{-}2).$$

Further, it is more desirable that instead of the formula (4), the formula (4-2) is satisfied:

$$sag10/sag7>2.8 \quad (4\text{-}2).$$

It is even more desirable that instead of the formula (4-2), the following formula (4-3) is satisfied:

$$sag10/sag7>3.5 \quad (4\text{-}3).$$

When the formulas (3-2), (4-2), and (4-3) are satisfied, it is possible to further increase the advantageous effect achieved by satisfying the formulas (3) and (4).

In the formulas (3) and (4), the effective diameter is used. If the effective diameter is unknown, the diameter of an optical functional surface, which is a range performing the function as an optical element, may be used instead of the effective diameter.

Figure 3A:
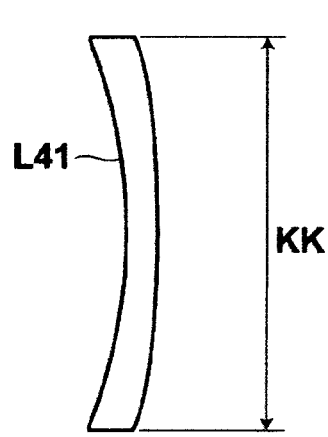
FIG. 3A is a diagram illustrating an example of an optical functional surface.
Figure 3B:
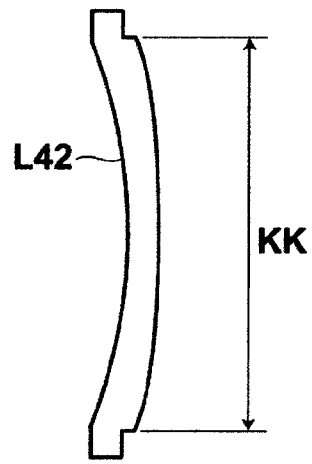
FIG. 3B is a diagram illustrating an example of an optical functional surface.
Figure 3C:
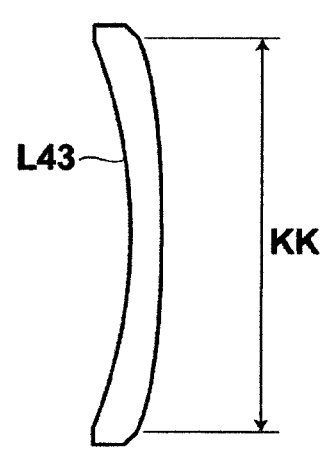
FIG. 3C is a diagram illustrating an example of an optical functional surface.

FIGS. 3A, 3B and 3C illustrate examples of the optical function surfaces. FIGS. 3A, 3B and 3C are cross-sections of lenses L41, L42 and L43 including an optical axis (not illustrated). The lenses L41, L42 and L43 have different external form from each other. FIGS. 3A, 3B and 3C illustrate examples of ranges KK of the optical functional surfaces with respect to the right-side surfaces of the respective lenses. In the lens L41 illustrated in FIG. 3A, the entire area of the right-side surface of the lens L41 is the optical functional surface. In the lens L42 illustrated in FIG. 3B, a level difference portion for attachment is formed in the vicinity of the peripheral area. In the lens L42, the region on the inside of the level difference portion is the optical functional surface. In the lens L43 illustrated in FIG. 3C, the peripheral area is beveled, and the region on the inside of the bevel is the optical functional surface.

In the above descriptions, the image-side surface of the lens L4 was described. However, the object-side surface of the lens L4 may be also an aspheric surface. In that case, it is possible to achieve higher performance.

Next, the structure of second lens group G2 of the variable magnification optical system 1 will be described. The second lens group G2 may include, for example, lens L5, cemented lens LC, negative lens L8, and positive lens L9, which are arranged from the object side of the second lens group G2, as illustrated in FIG. 1. In the second lens group G2, the object-side surface of the lens L5 is aspheric. The cemented lens LC includes two lenses, and one of the lenses is a positive lens and the other one is a negative lens. The image-side surface of the negative lens L8 is concave, and the object-side surface of the positive lens L9 is convex. Since the second lens group G2 includes the lens L5, the cemented lens LC, the lens L8 and the lens L9 as described above, it is possible to suppress spherical aberration, coma aberration and field curvature. Further, it is possible to realize high optical performance that can cope with the increase of resolution in recent years, while the compactness and the large aperture ratio are maintained.

In the example of the cemented lens LC in the second lens group G2 illustrated in FIG. 1, negative lens L6 and positive lens L7 are arranged from the object side of the cemented lens LC. Alternatively, the cemented lens LC may be structured by arranging the positive lens and the negative lens in a reverse order. Further, when reduction of the size of the optical system is important, it is desirable that the second lens group G2 is composed of five lenses as illustrated in FIG. 1. However, it is not necessary that the number of lenses of the second lens group G2 is five.

More specifically, in the example illustrated in FIG. 1, the second lens group G2 is composed of five lenses, namely, positive lens L5, cemented lens of negative lens L6 and positive lens L7, negative lens L8, and positive lens L9. The paraxial region of the positive lens L5 is in meniscus form having a convex surface facing the object side. The negative lens L6 is in meniscus form having a convex surface facing the object side. The positive lens L7 is in double convex form. The negative lens L8 is in meniscus form having a convex surface facing the object side. The positive lens L9 is in meniscus form having a convex surface facing the object side. The form of the lens L5, which is arranged on the most object side of the second lens group G2, is not limited to the form illustrated in FIG. 1. For example, the paraxial region of the lens L5 may be double convex. Further, the image-side surface of the lens L5 may be also aspheric.

The object-side surface of the lens L5, which is arranged on the most object side of the second lens group G2, is an aspheric surface. It is desirable that the aspheric surface is formed in such a manner that the positive power decreases from the center of the aspheric surface toward the periphery of the aspheric surface. Alternatively, it is desirable that the aspheric surface is formed in such a manner that an inflection point is present between the center of the aspheric surface and the periphery of the aspheric surface, and that the positive power decreases as a distance from the center increases between the center and the inflection point, and that the negative power increases toward the periphery between the inflection point and the periphery. Since the most object-side lens L5 of the second lens group G2 has an aspheric surface, and the form of the object-side surface of the lens L5 is formed as described above, it is possible to reduce spherical aberration. Further, it is possible to obtain a large aperture ratio, for example, corresponding to F-number of approximately 1.3, which is required by a monitor camera or the like. Further, it is possible to achieve high performance, while structuring the optical system in small size.

When the variable magnification optical system 1 is used in rough conditions, for example, such as outdoors, the material of the lens that is arranged on the most object side needs to be resistant to wind and rain, which damages the lens surface, and a change in temperature by direct sunlight. Further, the material needs to be resistant to chemicals, such as oil and fat, and detergent, in other words, the material needs to have high water-resistance, weather-resistance, acid-resistance, chemical-resistance, and the like. Further, the material needs to be hard and not easily breakable. Therefore, it is desirable that glass is used as the material of the most object-side lens. Alternatively, a transparent ceramic may be used.

When the variable magnification optical system 1 is used in rough conditions, not only the lens that is arranged on the most object-side but another lens or other lenses may be made of glass. Further, when the variable magnification optical system 1 is used in rough conditions, it is desirable that a multi-layer coating for protection is applied to the lens or lenses. Further, an anti-reflection coating for reducing ghost light during usage of the optical system may be provided, besides the multi-layer coating for protection.

In the example illustrated in FIG. 1, optical member PP is arranged between the lens system and the imaging plane. Instead of arranging various filters, such as a low-pass filter or a filter that cuts a specific wavelength band, between the lens system and imaging plane, these various filters may be arranged between lenses. Alternatively, a coating that acts similarly to the various filters may be applied to a lens surface of at least one of the lenses.

Next, examples of numerical values of the variable magnification optical system of the present invention will be described. FIGS. 4 through 10 are cross-sections of lenses in variable modification optical systems of Examples 1 through 7, respectively. In FIGS. 4 through 10, the left side is the object side, and the right side is the image side. The upper part illustrates the arrangement of lenses at wide angle end, and the lower part illustrates the arrangement of lenses at tele end. Further, optical member PP is also illustrated. Aperture stop St illustrated in FIGS. 4 through 10 does not necessarily represent the size nor the form of the aperture stop St, but the position of the aperture stop St on the optical axis Z.

Table 1 shows lens data about the variable magnification optical system of Example 1. Table 2 shows various data about the variable magnification optical system of Example 1. Table 3 shows aspheric surface data about the variable magnification optical system of Example 1. Similarly, Tables 4 through 21 show lens data, various data and aspheric surface data for the variable magnification optical systems of Examples 2 through 7. The meanings of the signs in the tables will be described by using Example 1, as an example. The meanings of the signs are basically the same in Examples 2 through 7.

In the lens data of Table 1, column Si shows the surface number of i-th surface (i=1, 2, 3, . . . ). The surface number of the object-side surface of the most object side element is 1, and surface numbers sequentially increase toward the image side. Column Ri shows the curvature radius of the i-th surface, and column Di shows an interval between i-th surface and (i+1) th surface on optical axis Z. Column Nej shows the refractive index of j-th (j=1, 2, 3, . . . ) optical element for e-line (wavelength is 546.07 nm). The number of the optical element located on the most object side is 1, and numbers sequentially increase toward the image side. Further, column vdj shows the Abbe number of the j-th optical element for d-line (wavelength is 587.6 nm). Here, the sign of the curvature radius is positive when a surface facing the object side is convex, and the sign of the curvature radius is negative when a surface facing the image side is convex. The lens data include aperture stop St and optical member PP. In the column Ri of curvature radius, the term "(APERTURE STOP)" is written for the surface corresponding to aperture stop St.

In the lens data of Table 1, "VARIABLE 1" AND "VARIABLE 2" are written in the rows of intervals between surfaces that change when magnification is changed. The "VARIABLE 1" represents an interval between the first lens group G1 and the aperture stop St. The "VARIABLE 2" represents an interval between the aperture stop St and the second lens group G2.

The various data in Table 2 show the focal length of the entire system for e-line, F-number, the full angle of view, and values of "VARIABLE 1" AND "VARIABLE 2" at wide angle end and at tele end. In the lens data and various data, the unit of angle is degrees, and the unit of length is "mm". However, since optical systems can achieve similar optical performance when they are proportionally enlarged or proportionally reduced, other appropriate units may be used.

In the lens data of Table 1, mark "*" is attached to the surface number of an aspheric surface. Table 1 shows, as the curvature radius of an aspheric surface, the numerical value of the paraxial curvature radius. The aspheric data in Table 3 show aspheric coefficients for the aspheric surfaces. In the aspheric data of Table 3, the numerical value "E-n" (n: integer) represents "×10$^{-n}$", and "E+n" represents "×10$^n$". Further, the aspheric coefficients are coefficients KA, Bm (m=3, 4, 5, . . . ) in the following equation (A) of aspheric surface:

$$Zd = C \cdot h^2 / \{1 + (1 - KA \cdot C^2 \cdot h^2)^{1/2}\} + \Sigma Bm \cdot h^m \quad (A),$$

where

Zd: depth of aspheric surface (length of a perpendicular from a point on an aspheric surface at height h to a flat plane that is perpendicular to an optical axis, the flat plane contacting with the vertex of the aspheric surface), h: height (distance from the optical axis to the lens surface), C: inverse number of paraxial curvature radius, and KA, Bm: aspheric coefficients (m=3, 4, 5, . . . 20).

TABLE 1

EXMPLE 1 LENS DATA

| Si | Ri | Di | Nej | vdj |
|---|---|---|---|---|
| 1 | 47.0929 | 0.800 | 1.90560 | 38.0 |
| 2 | 6.2760 | 2.073 | | |
| 3 | 12.5001 | 0.650 | 1.80229 | 48.2 |
| 4 | 8.6209 | 1.768 | | |
| 5 | 151.2792 | 2.006 | 1.93432 | 18.9 |
| 6 | -17.7033 | 0.241 | | |
| 7 | -14.4769 | 0.850 | 1.80449 | 40.9 |
| *8 | -41.9282 | VARIABLE 1 | | |
| 9 | (APERTURE STOP) | VARIABLE 2 | | |
| *10 | 7.0176 | 2.624 | 1.49846 | 81.5 |
| *11 | 6453919.0151 | 0.100 | | |
| 12 | 14.7308 | 0.650 | 1.93432 | 18.9 |
| 13 | 11.7872 | 3.456 | 1.49846 | 81.5 |
| 14 | -11.2642 | 0.100 | | |
| 15 | 10.0745 | 1.572 | 2.00069 | 28.7 |
| 16 | 4.1639 | 0.504 | | |
| 17 | 4.8593 | 2.135 | 1.49205 | 56.9 |
| 18 | 20.8075 | 0.348 | | |
| 19 | ∞ | 1.500 | 1.51825 | 64.1 |
| 20 | ∞ | | | |

TABLE 2

EXAMPLE 1 VARIOUS DATA

| | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.35 | 126.2 | 12.288 | 8.848 |
| TELE END | 9.916 | 2.94 | 34.4 | 1.800 | 0.900 |

TABLE 3

EXAMPLE 1 ASPHERIC SURFACE DATA

| | 8-TH SURFACE | 10-TH SURFACE | 11-TH SURFACE |
|---|---|---|---|
| B3 | 1.2067383E-05 | 1.7707621E-04 | 2.8842698E-04 |
| B4 | -2.4320377E-04 | -2.0971001E-04 | 4.5153822E-04 |
| B5 | -3.7789518E-07 | 1.8548181E-05 | 6.6677248E-05 |
| B6 | 6.8022831E-08 | 3.0698762E-06 | -5.6620853E-08 |
| B7 | -2.3710792E-07 | 9.7190423E-08 | -2.6293824E-07 |
| B8 | -5.0941783E-08 | -4.0536057E-08 | 3.5106042E-08 |
| B9 | -5.8087748E-09 | -6.1975824E-09 | 1.6891578E-08 |
| B10 | -2.9541735E-10 | -3.6129000E-10 | 3.0123217E-09 |
| B11 | 3.8096977E-11 | 1.2543484E-10 | 2.8019972E-10 |
| B12 | 1.2839730E-11 | 4.0251974E-11 | -1.2282592E-11 |
| B13 | 1.9661300E-12 | 6.2154816E-12 | -1.1956598E-11 |
| B14 | 1.4884826E-13 | 3.0806093E-13 | -3.1971390E-12 |
| B15 | -1.4624686E-14 | -1.5426828E-13 | -6.1485188E-13 |
| B16 | -8.8126512E-15 | -6.2152780E-14 | -9.3359640E-14 |
| B17 | -2.1300954E-15 | -1.4858893E-14 | -1.0478601E-14 |
| B18 | -3.5595283E-16 | -2.3290885E-15 | -3.9842790E-16 |
| B19 | -3.7205040E-17 | -1.3067428E-16 | 2.0939499E-16 |
| B20 | 2.2795526E-18 | 8.1647194E-17 | 8.4731262E-17 |
| KA | 1.5503276E+00 | 7.1670789E-01 | 6.0558533E-01 |

TABLE 4

EXAMPLE 2 LENS DATA

| Si | Ri | Di | Nej | vdj |
|---|---|---|---|---|
| 1 | 47.5818 | 0.800 | 1.90645 | 37.1 |
| 2 | 6.2895 | 2.073 | | |
| 3 | 12.5021 | 0.650 | 1.88814 | 40.8 |
| 4 | 8.5837 | 1.739 | | |
| 5 | 103.3253 | 2.055 | 1.93432 | 18.9 |
| 6 | −17.7598 | 0.196 | | |
| 7 | −15.1752 | 0.850 | 1.81080 | 40.7 |
| *8 | −45.6866 | VARIABLE 1 | | |
| 9 | (APERTURE STOP) | VARIABLE 2 | | |
| *10 | 6.8462 | 2.661 | 1.49846 | 81.5 |
| *11 | −7294643.3399 | 0.100 | | |
| 12 | 16.3974 | 0.650 | 1.81643 | 22.8 |
| 13 | 12.4123 | 3.382 | 1.49846 | 81.5 |
| 14 | −11.1591 | 0.100 | | |
| 15 | 9.6105 | 1.532 | 2.01167 | 28.3 |
| 16 | 4.1291 | 0.501 | | |
| 17 | 4.8141 | 2.103 | 1.48915 | 70.2 |
| 18 | 18.8936 | 0.368 | | |
| 19 | ∞ | 1.500 | 1.51825 | 64.1 |
| 20 | ∞ | 4.200 | | |

TABLE 5

EXAMPLE 2 VARIOUS DATA

| | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.35 | 125.4 | 12.500 | 8.772 |
| TELE END | 9.916 | 2.93 | 34.4 | 1.774 | 0.900 |

TABLE 6

EXAMPLE 2 ASPHERIC SURFACE DATA

| | 8-TH SURFACE | 10-TH SURFACE | 11-TH SURFACE |
|---|---|---|---|
| B3 | 4.8439448E−05 | 1.7749491E−04 | 2.8315754E−04 |
| B4 | −2.7382292E−04 | −2.1486195E−04 | 4.6438892E−04 |
| B5 | 5.1301423E−06 | 1.7264642E−05 | 7.0267122E−05 |
| B6 | 1.2143360E−07 | 3.2114921E−06 | −4.2587194E−08 |
| B7 | −3.3574218E−07 | 1.5709260E−07 | −2.9495949E−07 |
| B8 | −6.4909837E−08 | −3.1655090E−08 | 3.4121871E−08 |
| B9 | −6.2864249E−09 | −5.7485192E−09 | 1.8156698E−08 |
| B10 | −1.1707856E−10 | −4.6819406E−10 | 3.4267772E−09 |
| B11 | 8.4494141E−11 | 9.5219673E−11 | 3.6475834E−10 |
| B12 | 1.9135401E−11 | 3.7425822E−11 | 6.5571050E−13 |
| B13 | 2.3616508E−12 | 6.6835460E−12 | −1.0493530E−11 |
| B14 | 8.4340916E−14 | 5.8196483E−13 | −3.1146542E−12 |
| B15 | −4.3026141E−14 | −8.2016961E−14 | −6.2866362E−13 |
| B16 | −1.5076199E−14 | −4.8318605E−14 | −9.9403838E−14 |
| B17 | −3.0858736E−15 | −1.2980041E−14 | −1.1829106E−14 |
| B18 | −4.3921179E−16 | −2.2369849E−15 | −6.2195340E−16 |
| B19 | −2.6755270E−17 | −1.8162637E−16 | 1.8334935E−16 |
| B20 | 9.8835833E−18 | 5.7271040E−17 | 8.4165383E−17 |
| KA | 1.5991271E+00 | 7.0078904E−01 | 6.0558080E−01 |

TABLE 7

EXAMPLE 3 LENS DATA

| Si | Ri | Di | Nej | vdj |
|---|---|---|---|---|
| 1 | 51.5145 | 0.800 | 1.90562 | 38.0 |
| 2 | 6.1157 | 2.056 | | |
| 3 | 12.5013 | 0.650 | 1.85266 | 43.2 |
| 4 | 8.8125 | 1.727 | | |
| 5 | 1339.4377 | 1.961 | 1.93432 | 18.9 |
| 6 | −16.5923 | 0.218 | | |
| 7 | −13.9852 | 0.850 | 1.80414 | 46.0 |
| *8 | −33.2305 | VARIABLE 1 | | |
| 9 | (APERTURE STOP) | VARIABLE 2 | | |
| *10 | 7.0353 | 3.153 | 1.49846 | 81.5 |
| *11 | −21.0511 | 0.100 | | |
| 12 | 18.1893 | 0.650 | 1.81643 | 22.8 |
| 13 | 12.3100 | 3.278 | 1.49846 | 81.5 |
| 14 | −11.8558 | 0.100 | | |
| 15 | 13.3133 | 1.300 | 1.96454 | 32.2 |
| 16 | 4.2991 | 0.574 | | |
| 17 | 5.1157 | 2.114 | 1.49204 | 56.9 |
| 18 | 27.2289 | 0.292 | | |
| 19 | ∞ | 1.500 | 1.51825 | 64.1 |
| 20 | ∞ | 4.200 | | |

TABLE 8

EXAMPLE 3 VARIOUS DATA

| | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.36 | 126.6 | 12.137 | 9.051 |
| TELE END | 9.916 | 2.99 | 34.4 | 1.835 | 0.900 |

TABLE 9

EXAMPLE 3 ASPHERIC SURFACE DATA

| | 8-TH SURFACE | 10-TH SURFACE | 11-TH SURFACE |
|---|---|---|---|
| B3 | 2.3239557E−05 | 1.0304841E−04 | 1.6837244E−04 |
| B4 | −2.5907356E−04 | −2.0944146E−04 | 3.4084789E−04 |
| B5 | 9.2225086E−07 | 1.6169838E−05 | 5.0456886E−05 |
| B6 | −3.0359746E−09 | 2.7868348E−06 | −2.2948006E−06 |
| B7 | −2.7650108E−07 | 9.4730761E−08 | −5.5866666E−07 |
| B8 | −5.5395030E−08 | −3.6815631E−08 | 2.7932756E−11 |
| B9 | −5.8926754E−09 | −5.7044358E−09 | 1.3567230E−08 |
| B10 | −2.4746333E−10 | −3.8153430E−10 | 2.8559958E−09 |
| B11 | 4.4864180E−11 | 1.0423193E−10 | 3.0958678E−10 |
| B12 | 1.2239865E−11 | 3.5021067E−11 | −6.6784082E−13 |
| B13 | 1.4718502E−12 | 5.3701715E−12 | −9.3332487E−12 |
| B14 | 8.0570046E−15 | 2.2036095E−13 | −2.7065192E−12 |
| B15 | −4.4338392E−14 | −1.5421196E−13 | −5.3189539E−13 |
| B16 | −1.3821778E−14 | −5.9143110E−14 | −8.0170660E−14 |
| B17 | −2.7959057E−15 | −1.3832509E−14 | −8.4601629E−15 |
| B18 | −4.0774380E−16 | −2.0758989E−15 | −9.4985789E−17 |
| B19 | −3.0690400E−17 | −7.6598876E−17 | 2.5515746E−16 |
| B20 | 6.7089356E−18 | 9.2301671E−17 | 9.1770600E−17 |
| KA | 1.5631440E+00 | 1.2767423E−01 | 2.9109721E−01 |

TABLE 10

EXAMPLE 4 LENS DATA

| Si | Ri | Di | Nej | vdj |
|---|---|---|---|---|
| 1 | 48.3515 | 0.800 | 1.89975 | 38.6 |
| 2 | 6.0827 | 2.360 | | |
| 3 | 16.4333 | 0.650 | 1.75475 | 52.9 |
| 4 | 9.4910 | 1.262 | | |
| 5 | 35.6326 | 2.017 | 1.93432 | 18.9 |
| 6 | −24.2894 | 0.146 | | |
| *7 | −21.4603 | 0.850 | 1.81080 | 40.7 |
| *8 | −2499.7791 | VARIABLE 1 | | |
| 9 | (APERTURE STOP) | VARIABLE 2 | | |
| *10 | 7.7837 | 2.998 | 1.49846 | 81.5 |
| *11 | −25.4451 | 0.100 | | |
| 12 | 17.2012 | 0.650 | 1.81643 | 22.8 |
| 13 | 12.2085 | 3.663 | 1.49846 | 81.5 |
| 14 | −10.0738 | 0.278 | | |
| 15 | 11.0421 | 0.772 | 1.96706 | 32.0 |
| 16 | 4.5569 | 0.804 | | |
| 17 | 5.4586 | 2.238 | 1.49186 | 62.5 |
| 18 | 16.0601 | 0.478 | | |
| 19 | ∞ | 1.500 | 1.51825 | 64.1 |
| 20 | ∞ | 4.335 | | |

TABLE 11

EXAMPLE 4 VARIOUS DATA

| | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.32 | 128.8 | 11.309 | 9.650 |
| TELE END | 9.916 | 3.03 | 34.6 | 2.430 | 0.900 |

TABLE 12

EXAMPLE 4 ASPHERIC SURFACE DATA

| | 7-TH SURFACE | 8-TH SURFACE | 10-TH SURFACE | 11-TH SURFACE |
|---|---|---|---|---|
| B3 | −8.1652311E−04 | −7.1033038E−04 | 1.0029642E−04 | 1.7826390E−04 |
| B4 | 2.2084187E−05 | −2.7351706E−04 | −2.0573362E−04 | 3.6596126E−04 |
| B5 | 4.0411292E−06 | 1.4483095E−05 | 1.6033635E−05 | 4.9673696E−05 |
| B6 | 6.2039583E−07 | 1.3442234E−06 | 1.5708379E−06 | −1.5699670E−06 |
| B7 | 8.3548175E−08 | −3.0591542E−07 | −4.8195015E−08 | −4.9239102E−07 |
| B8 | 3.5622984E−09 | −8.2278588E−08 | −4.4319193E−08 | −1.4913480E−08 |
| B9 | −1.2815675E−09 | −1.0776594E−08 | −7.2289737E−09 | 7.9514258E−09 |
| B10 | −4.0775822E−10 | −8.2842072E−10 | −1.0892820E−09 | 1.7652607E−09 |
| B11 | −7.2226369E−11 | 5.6041275E−12 | −9.0083795E−11 | 1.4289580E−10 |
| B12 | −9.6013072E−12 | 1.5458115E−11 | −2.9794503E−12 | −2.4252727E−11 |
| B13 | −9.1371268E−13 | 3.4275793E−12 | −2.4345160E−13 | −1.2802163E−11 |
| B14 | −2.5760937E−14 | 5.0901576E−13 | −3.8339358E−13 | −3.2605590E−12 |
| B15 | 1.3972768E−14 | 5.3609102E−14 | −1.8649875E−13 | −6.2427232E−13 |
| B16 | 5.0917385E−15 | 1.9498712E−15 | −5.5321453E−14 | −9.4783555E−14 |
| B17 | 1.2091668E−15 | −8.6058196E−16 | −1.2776243E−14 | −1.0315433E−14 |
| B18 | 2.4811258E−16 | −3.1887010E−16 | −2.1122181E−15 | −2.0053004E−16 |
| B19 | 5.0421542E−17 | −7.5847477E−17 | −1.7444518E−16 | 2.9392421E−16 |
| B20 | 9.8865955E−18 | −1.4616360E−17 | 4.9800578E−17 | 1.1193859E−16 |
| KA | −9.4429183E−02 | 1.5523542E+00 | 1.1397710E−01 | 1.2488763E−01 |

TABLE 13

EXAMPLE 5 LENS DATA

| Si | Ri | Di | Nej | vdj |
|---|---|---|---|---|
| 1 | 38.3396 | 0.800 | 1.88814 | 40.8 |
| 2 | 6.4735 | 2.156 | | |
| 3 | 12.5013 | 0.650 | 1.73234 | 54.7 |
| 4 | 8.5254 | 1.680 | | |
| 5 | 49.0921 | 2.229 | 1.93432 | 18.9 |
| 6 | −21.4836 | 0.296 | | |
| *7 | −16.5320 | 0.850 | 1.80800 | 40.4 |
| *8 | −832.5905 | VARIABLE 1 | | |
| 9 | (APERTURE STOP) | VARIABLE 2 | | |
| *10 | 7.4544 | 3.239 | 1.49664 | 82.0 |
| *11 | −26.1043 | 0.100 | | |
| 12 | 19.6757 | 0.650 | 1.81643 | 22.8 |
| 13 | 13.1377 | 3.620 | 1.49846 | 81.5 |
| 14 | −9.7973 | 0.100 | | |
| 15 | 10.0941 | 0.693 | 2.01167 | 28.3 |
| 16 | 4.5737 | 0.730 | | |
| 17 | 5.4557 | 2.150 | 1.57046 | 42.8 |
| 18 | 13.7309 | 0.546 | | |
| 19 | ∞ | 1.500 | 1.51825 | 64.1 |
| 20 | ∞ | 4.335 | | |

TABLE 14

EXAMPLE 5 VARIOUS DATA

| | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.35 | 127.8 | 11.405 | 9.131 |
| TELE END | 9.916 | 2.96 | 34.4 | 1.741 | 0.900 |

TABLE 15

EXAMPLE 5 ASPHERIC SURFACE DATA

|     | 7-TH SURFACE    | 8-TH SURFACE    | 10-TH SURFACE   | 11-TH SURFACE   |
| --- | --------------- | --------------- | --------------- | --------------- |
| B3  | −4.9893316E−04  | −3.9612372E−04  | 1.7090295E−04   | 1.9770986E−04   |
| B4  | −2.0736256E−05  | −2.7950072E−04  | −2.0761598E−04  | 3.8371219E−04   |
| B5  | 6.6513454E−06   | 1.0703903E−05   | 2.8840419E−05   | 4.3454281E−05   |
| B6  | 9.5092416E−07   | 1.2175101E−06   | 1.5315006E−06   | −7.2219480E−07  |
| B7  | 4.7989832E−08   | −2.0077996E−07  | −2.0578203E−07  | −2.7002512E−07  |
| B8  | −6.9866686E−09  | −5.2782858E−08  | −5.9782353E−08  | −6.0183797E−09  |
| B9  | −2.0513866E−09  | −6.0759397E−09  | −7.1861016E−09  | 3.5060534E−09   |
| B10 | −2.9401976E−10  | −3.4303034E−10  | −9.4148844E−10  | 4.4670028E−10   |
| B11 | −2.4720566E−11  | 1.9051779E−11   | −9.3156347E−11  | −8.5391293E−11  |
| B12 | −8.9986418E−13  | 7.2081087E−12   | −1.2321486E−11  | −5.2457969E−11  |
| B13 | −3.9261224E−14  | 7.6317550E−13   | −3.1440738E−12  | −1.4931194E−11  |
| B14 | −3.7866310E−14  | −2.2247482E−14  | −9.8327547E−13  | −3.1730676E−12  |
| B15 | −2.0975511E−14  | −3.1427601E−14  | −2.7747945E−13  | −5.5024158E−13  |
| B16 | −5.8995189E−15  | −8.8892854E−15  | −6.5517188E−14  | −7.6405953E−14  |
| B17 | −1.2727351E−15  | −1.7020398E−15  | −1.2886444E−14  | −6.9069805E−15  |
| B18 | −2.2291804E−16  | −2.5307227E−16  | −1.7813804E−15  | 3.2498277E−16   |
| B19 | −2.8351876E−17  | −2.3601243E−17  | −5.1441083E−17  | 3.5712195E−16   |
| B20 | −1.3337970E−18  | 9.4104913E−19   | 8.3063552E−17   | 1.1692547E−16   |
| KA  | 1.1938821E+00   | 1.5486182E+00   | −9.6667664E−02  | 5.0517392E−02   |

TABLE 16

EXAMPLE 6 LENS DATA

| Si  | Ri            | Di         | Nej     | vdj  |
| --- | ------------- | ---------- | ------- | ---- |
| 1   | 34.1032       | 0.800      | 1.88814 | 40.8 |
| 2   | 6.8935        | 2.101      |         |      |
| 3   | 12.5494       | 0.650      | 1.69979 | 55.5 |
| 4   | 8.0386        | 1.807      |         |      |
| 5   | 39.4907       | 2.301      | 1.93432 | 18.9 |
| 6   | −22.0923      | 0.455      |         |      |
| *7  | −14.7447      | 0.900      | 1.80800 | 40.4 |
| *8  | 249.9763      | VARIABLE 1 |         |      |
| 9   | (APERTURE STOP) | VARIABLE 2 |       |      |
| *10 | 7.6696        | 3.314      | 1.49664 | 82.0 |
| *11 | −25.7571      | 0.100      |         |      |
| 12  | 15.1813       | 0.652      | 1.79192 | 25.7 |
| 13  | 10.7120       | 3.477      | 1.49846 | 81.5 |
| 14  | −10.7120      | 0.100      |         |      |
| 15  | 12.9790       | 1.147      | 2.01167 | 28.3 |
| 16  | 4.7397        | 0.764      |         |      |
| 17  | 5.8011        | 2.622      | 1.57046 | 42.8 |
| 18  | 25.5394       | 0.344      |         |      |
| 19  | ∞             | 1.000      | 1.51825 | 64.1 |
| 20  | ∞             | 4.249      |         |      |

TABLE 17

EXAMPLE 6 VARIOUS DATA

|              | FOCAL LENGTH | F-NUMBER | FULL ANGLE OF VIEW | VARIABLE 1 | VARIABLE 2 |
| ------------ | ------------ | -------- | ------------------ | ---------- | ---------- |
| WIDE ANGLE END | 2.874      | 1.35     | 137.2              | 10.601     | 9.213      |
| TELE END     | 9.914        | 3.05     | 36.2               | 2.000      | 0.814      |

EXAMPLE 6 ASPHERIC SURFACE DATA

|     | 7-TH SURFACE    | 8-TH SURFACE    | 10-TH SURFACE   | 11-TH SURFACE   |
| --- | --------------- | --------------- | --------------- | --------------- |
| B3  | −2.5994267E−04  | −1.8033497E−04  | 1.6098038E−04   | 1.2497029E−04   |
| B4  | −9.6382102E−05  | −4.2686040E−04  | −2.1211870E−04  | 3.6556884E−04   |
| B5  | 4.2258546E−05   | 3.9961388E−05   | 3.7949279E−05   | 2.6138171E−05   |
| B6  | 1.5066338E−06   | 1.8180323E−06   | 2.4904898E−07   | −1.1907632E−07  |
| B7  | −4.2416096E−07  | −6.1376045E−07  | −3.3356436E−07  | 1.6519442E−07   |
| B8  | −7.3826839E−08  | −9.6263451E−08  | −2.7543028E−08  | 1.5657995E−08   |
| B9  | −3.0703135E−09  | −4.2253853E−09  | 5.1537016E−10   | −4.1637572E−09  |
| B10 | 1.0769024E−09   | 7.8897190E−10   | −4.9006034E−10  | −1.3760271E−09  |
| B11 | 3.2048715E−10   | 1.7907106E−10   | −2.0114544E−10  | −2.4481626E−10  |
| B12 | 4.6444053E−11   | 1.7797617E−11   | −4.3775500E−11  | −3.1562951E−11  |
| B13 | 2.8096237E−12   | −2.1603721E−13  | −6.2937508E−12  | −4.2181035E−12  |
| B14 | −6.0045231E−13  | −4.0861413E−13  | −5.1244974E−13  | −6.4908449E−13  |
| B15 | −2.6429298E−13  | −8.5921033E−14  | −1.6129329E−16  | −1.2729705E−13  |
| B16 | −5.9648765E−14  | −1.1508281E−14  | 6.9575472E−15   | −2.5491076E−14  |
| B17 | −9.3991857E−15  | −7.3739746E−16  | 1.4999522E−16   | −3.9304654E−15  |
| B18 | −8.2471684E−16  | 4.9549404E−17   | −4.0050590E−16  | −2.4403800E−16  |
| B19 | 1.0397884E−16   | 6.8376124E−18   | −1.2117753E−16  | 5.6186253E−17   |
| B20 | 7.6996025E−17   | −7.2786590E−18  | −1.5600082E−17  | 3.7522350E−17   |
| KA  | 3.5116905E+00   | 1.5299986E+00   | −2.1862327E−01  | 1.0557304E−01   |

TABLE 19

EXAMPLE 7 LENS DATA

| Si | Ri | Di | Nej | vdj |
|---|---|---|---|---|
| 1 | 29.3461 | 0.800 | 1.88814 | 40.8 |
| 2 | 5.9285 | 3.993 | | |
| 3 | −30.5157 | 3.136 | 1.93432 | 18.9 |
| 4 | −11.3636 | 0.144 | | |
| *5 | −11.3635 | 1.372 | 1.80800 | 40.4 |
| *6 | −171.5789 | VARIABLE 1 | | |
| 7 | (APERTURE STOP) | VARIABLE 2 | | |
| *8 | 8.5240 | 2.988 | 1.71673 | 54.4 |
| *9 | −35.3327 | 0.100 | | |
| 10 | 17.4274 | 0.650 | 1.81265 | 25.4 |
| 11 | 10.5768 | 3.513 | 1.49846 | 81.5 |
| 12 | −10.5768 | 0.100 | | |
| 13 | 14.3025 | 0.650 | 2.01167 | 28.3 |
| 14 | 4.6357 | 1.200 | | |
| 15 | 6.0722 | 2.472 | 1.53348 | 49.2 |
| 16 | 26.2236 | 0.322 | | |
| 17 | ∞ | 1.000 | 1.51825 | 64.1 |
| 18 | ∞ | | | |

TABLE 20

EXAMPLE 7 VARIOUS DATA

| | FOCAL LENGTH | F-NUMBER | FULL ANGLE OF VIEW | VARIABLE 1 | VARIABLE 2 |
|---|---|---|---|---|---|
| WIDE ANGLE END | 2.874 | 1.38 | 128.8 | 10.411 | 9.699 |
| TELE END | 9.916 | 3.26 | 34.6 | 2.138 | 0.840 |

TABLE 21

EXAMPLE 7 ASPHERIC SURFACE DATA

| | 5-TH SURFACE | 6-TH SURFACE | 8-TH SURFACE | 9-TH SURFACE |
|---|---|---|---|---|
| B3 | −4.6556583E−04 | −3.6823765E−04 | 1.1781552E−04 | 8.9397121E−05 |
| B4 | −1.4283790E−04 | −4.0159499E−04 | −2.1132669E−04 | 3.1157482E−04 |
| B5 | 4.2823763E−05 | 4.3496421E−05 | 3.4426858E−05 | 2.2013774E−05 |
| B6 | 2.5562934E−06 | 2.1496003E−06 | −1.0658560E−07 | −3.8820799E−07 |
| B7 | −2.0807402E−07 | −5.6767880E−07 | −3.2545234E−07 | 1.4307968E−07 |
| B8 | −4.3028901E−08 | −8.6488343E−08 | −1.8620120E−08 | 1.3432877E−08 |
| B9 | 5.4321528E−10 | −2.2034139E−09 | 2.4903000E−09 | −4.3836446E−09 |
| B10 | 1.4540979E−09 | 1.1498674E−09 | −1.7535585E−10 | −1.3950009E−09 |
| B11 | 3.5941743E−10 | 2.3501773E−10 | −1.6092353E−10 | −2.4644517E−10 |
| B12 | 5.1240124E−11 | 2.5422003E−11 | −3.9823351E−11 | −3.1779749E−11 |
| B13 | 3.6183332E−12 | 7.0449027E−12 | −6.1149639E−12 | −4.2634274E−12 |
| B14 | −4.3867602E−13 | −3.1298704E−13 | −5.5252985E−13 | −6.6054915E−13 |
| B15 | −2.3169060E−13 | −7.7554205E−14 | −1.5226273E−14 | −1.3011406E−13 |
| B16 | −5.3323883E−14 | −1.0873350E−14 | 3.6852179E−15 | −2.6153910E−14 |
| B17 | −8.2727908E−15 | −6.5739701E−16 | −3.8345401E−16 | −4.0776833E−15 |
| B18 | −6.3930072E−16 | 7.4044142E−17 | −4.6601808E−16 | −2.7673224E−16 |
| B19 | 1.3102182E−16 | 1.5499588E−17 | −1.2375041E−16 | 4.8821397E−17 |
| B20 | 8.0416218E−17 | −4.6949855E−18 | −1.4070357E−17 | 3.5906182E−17 |
| KA | 2.7468485E+00 | 1.5082882E+00 | 1.9865621E−01 | 2.7302926E−01 |

The schematic structure of the variable magnification optical system of Example 1 will be described. The variable magnification optical system of Example 1 includes first lens group G1, which is four-lens group, and second lens group G2, which is five-lens group, and the first lens group G1 and the second lens group G2 are sequentially arranged from the object side. In the first lens group G1, negative lens L1, negative lens L2, positive lens L3, and negative lens L4 are sequentially arrange from the object side. The negative lens L1 is in meniscus form having a convex surface facing the object side, and the negative lens L2 is in meniscus form having a convex surface facing the object side. The positive lens L3 is in double convex form, and the negative lens L4 is in meniscus form having a convex surface facing the image side in the paraxial region. In the second lens group G2, positive lens L5, cemented lens of negative lens L6 and positive lens L7, negative lens L8, and positive lens L9 are sequentially arranged from the objet side. The positive lens L5 is in meniscus form having a convex surface facing the object side in the paraxial region. The negative lens L6 is in meniscus form having a convex surface facing the object side, and the positive lens L7 is in double convex form. The negative lens L8 is in meniscus form having a convex surface facing the object side, and the positive lens L9 is in meniscus form having a convex surface facing the object side. The image-side surface of the lens L4 and the two sides (object-side and image-side) of the lens L5 are aspheric.

The schematic structure of the variable magnification optical systems of Examples 2 and 3 differs from that of Example 1 in that the lens L5 is in double convex form in the paraxial region in Examples 2 and 3, but the remaining structure is similar to that of Example 1. The schematic structure of the variable magnification optical systems of Examples 4 and 5 differs from that of Example 1 in that the lens L5 is in double convex form in the paraxial region and the two sides of the lens L4 and the two sides of the lens L5 are aspheric in Examples 4 and 5. However, the remaining structure is similar to that of Example 1. The schematic structure of the variable magnification optical system of Example 6 differs from that of Example 1 in that the lens L4 is in double concave form in the paraxial region, the lens L5 is in double convex form in the paraxial region, and the two sides of the lens L4 and the two sides of the lens L5 are aspheric in Example 6. However, the remaining structure is similar to that of Example 1. The schematic structure of the variable magnification optical system of Example 7 differs from that of Example 1 in that the first lens group G1 has three-lens structure composed of negative lens L12 in meniscus form having a convex surface facing the object side, positive lens L3 in meniscus form having a convex surface facing the image side, and negative lens L4 in meniscus form having a convex surface facing the image side in the paraxial region in Example 7. Further, the schematic structure of the variable magnification optical system of Example 7 differs from that of Example 1 in that the lens L5 is in double convex form in the paraxial region, and that the two sides of the lens L4 and the two sides of the lens L5 are aspheric in Example 7. However, the remaining structure is similar to that of Example 1.

Figure 11A:
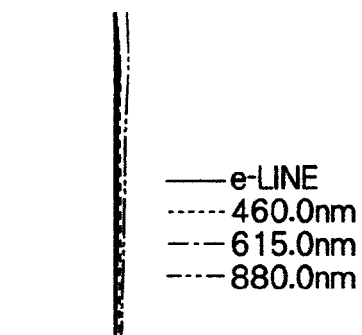
FIGS. 11A through 11F are diagrams illustrating longitudinal aberrations of the variable magnification optical system in Example 1 of the present invention.
Figure 11B:
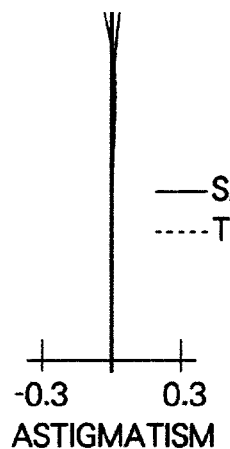
Figure 11C:
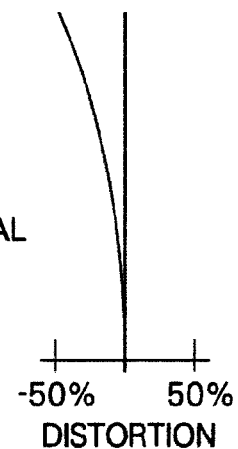
Figure 11D:
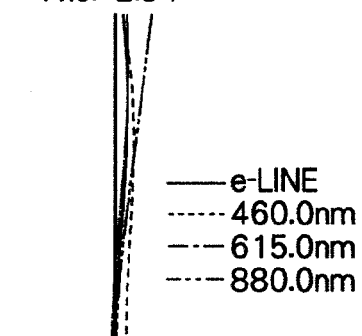
Figure 11E:
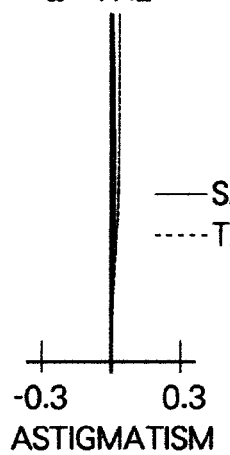
Figure 11F:
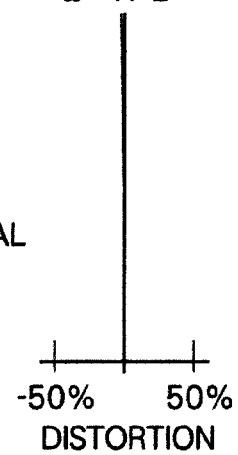
Figure 13A:
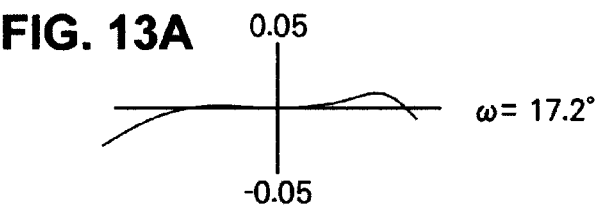
FIGS. 13A through 13I are diagrams illustrating lateral aberrations of the variable magnification optical system in Example 1 of the present invention at tele end.
Figure 13F:
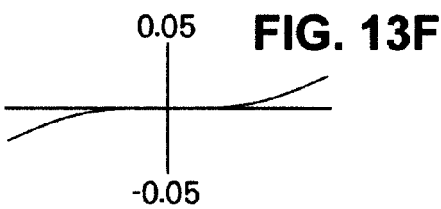
Figure 13B:
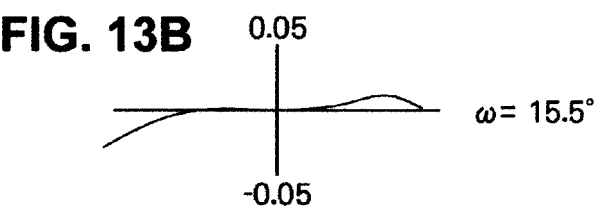
Figure 13G:
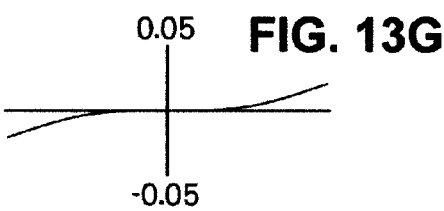
Figure 13C:
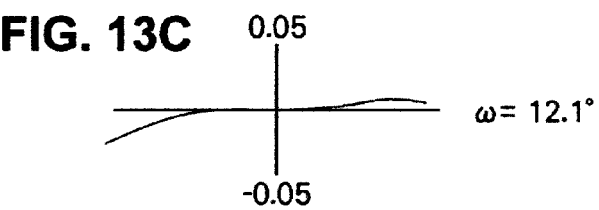
Figure 13H:
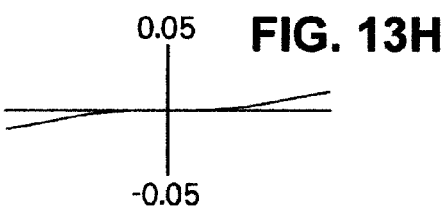
Figure 13D:
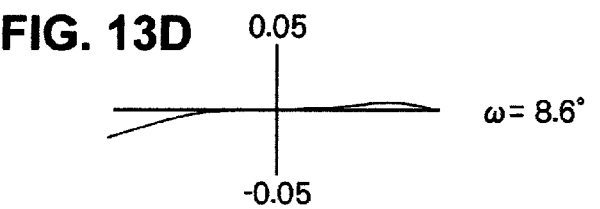
Figure 13I:
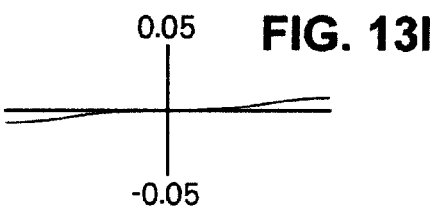
Figure 13E:
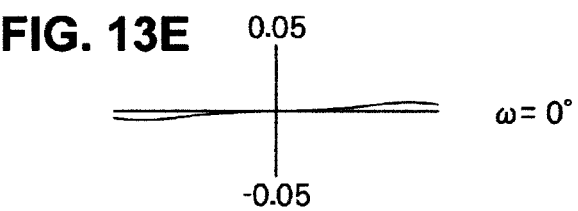
Figure 14A:
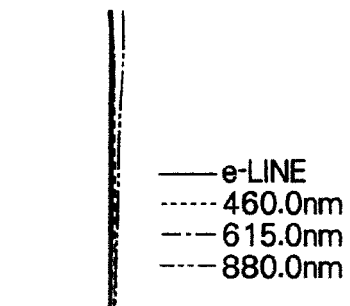
FIGS. 14A through 14F are diagrams illustrating longitudinal aberrations of the variable magnification optical system in Example 2 of the present invention.
Figure 14B:
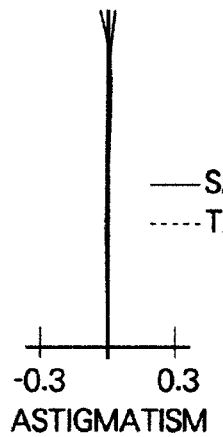
Figure 14C:
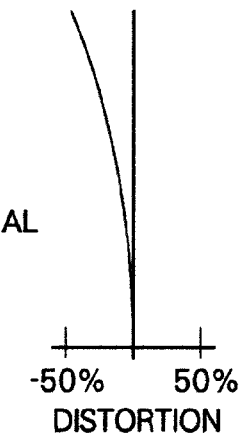
Figure 14D:
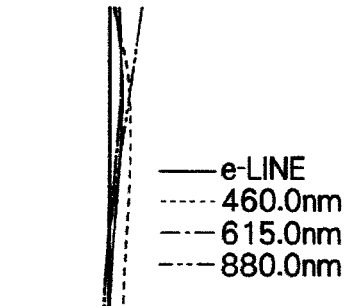
Figure 14E:
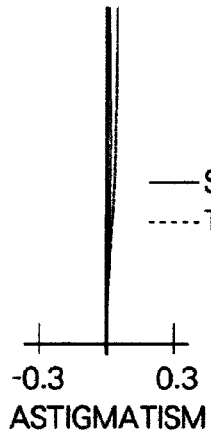
Figure 14F:
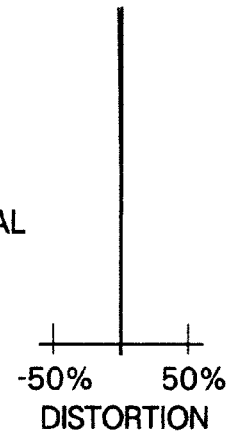
Figure 17A:
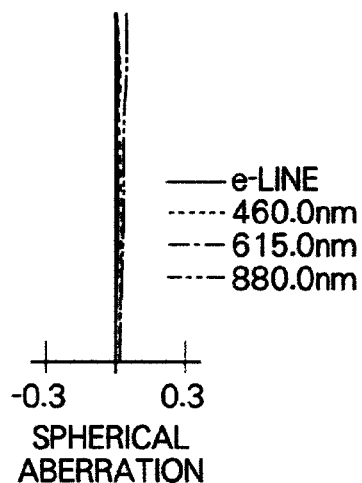
FIGS. 17A through 17F are diagrams illustrating longitudinal aberrations of the variable magnification optical system in Example 3 of the present invention.
Figure 17B:
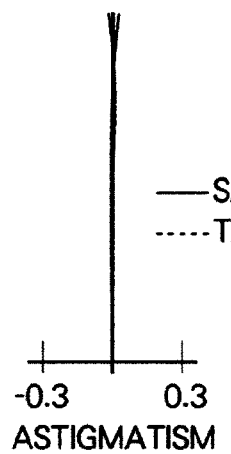
Figure 17C:
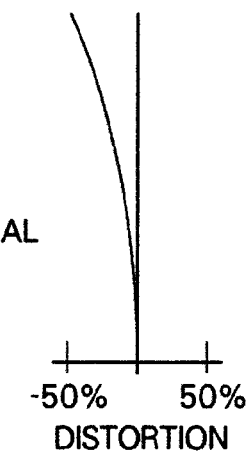
Figure 17D:
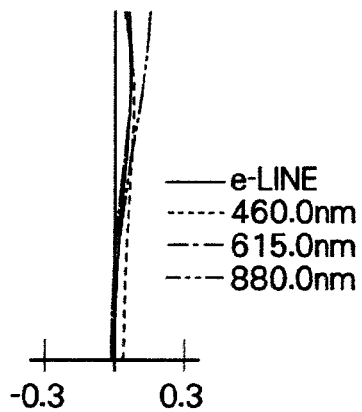
Figure 17E:
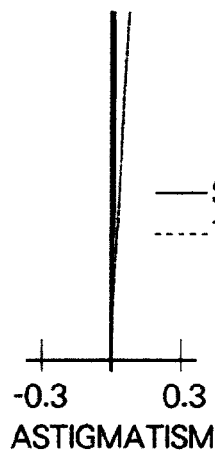
Figure 17F:
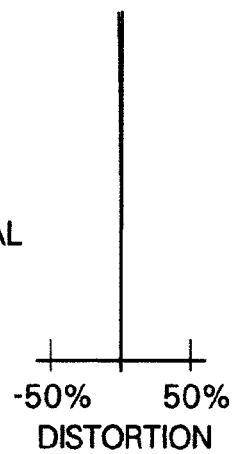
Figure 18A:
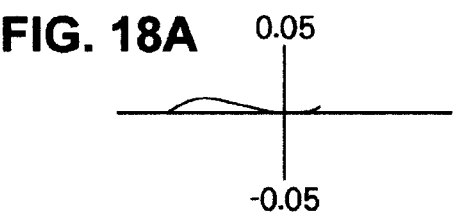
FIGS. 18A through 18I are diagrams illustrating lateral aberrations of the variable magnification optical system in Example 3 of the present invention at wide angle end.
Figure 18F:
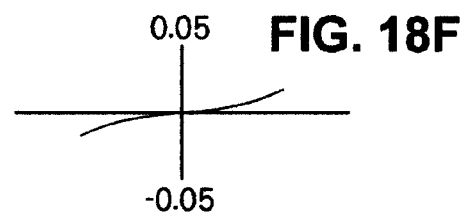
Figure 18B:
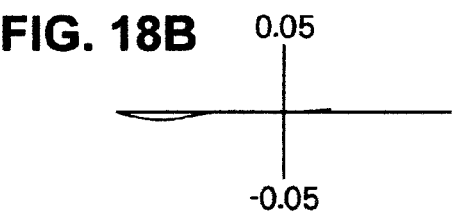
Figure 18G:
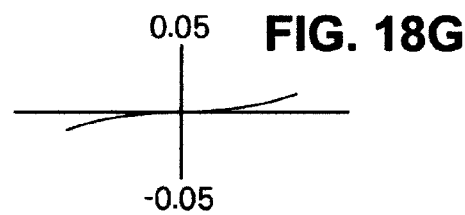
Figure 18C:
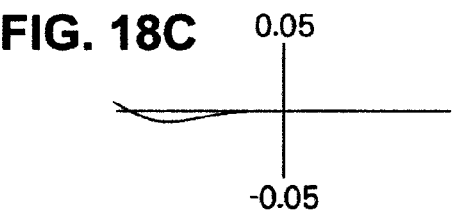
Figure 18H:
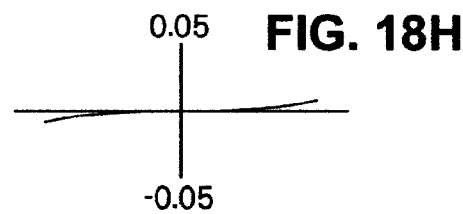
Figure 18D:
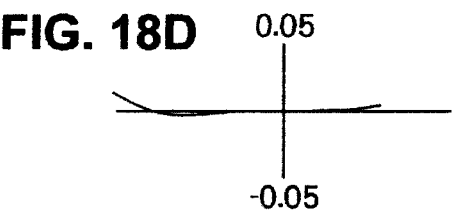
Figure 18I:
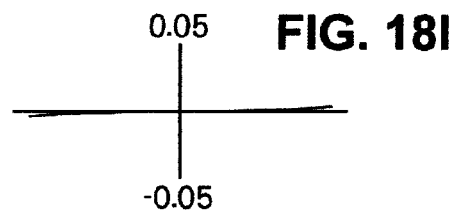
Figure 18E:
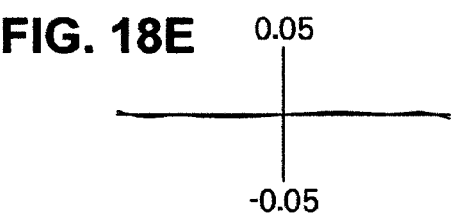
Figure 19A:
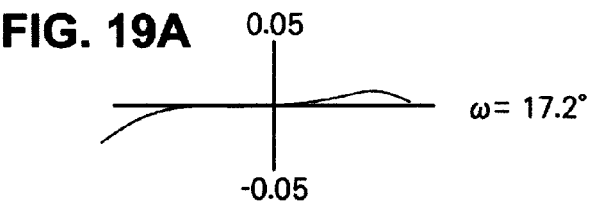
FIGS. 19A through 19I are diagrams illustrating lateral aberrations of the variable magnification optical system in Example 3 of the present invention at tele end.
Figure 19F:
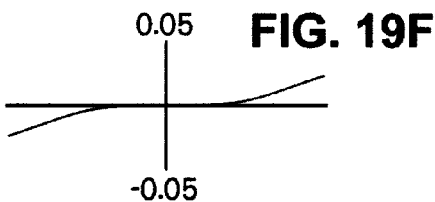
Figure 19B:
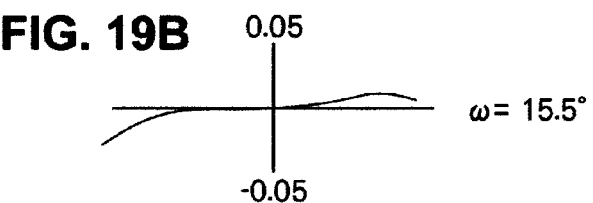
Figure 19G:
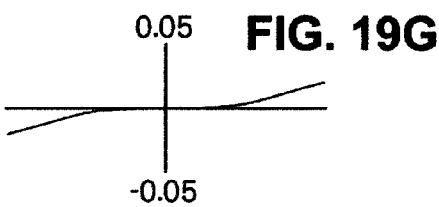
Figure 19C:
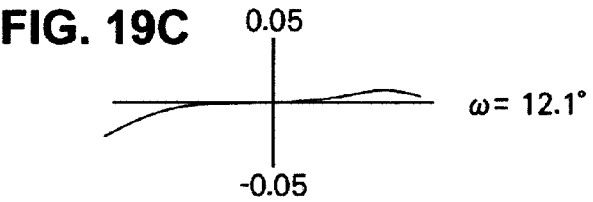
Figure 19H:
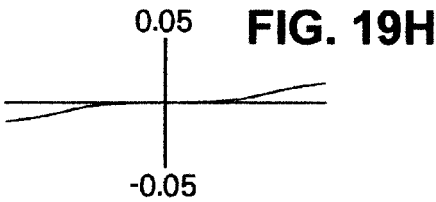
Figure 19D:
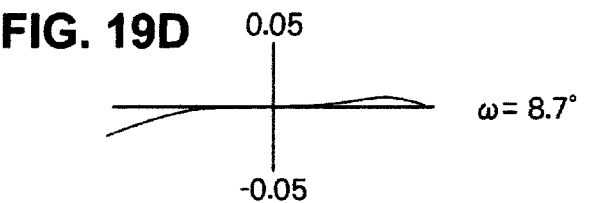
Figure 19I:
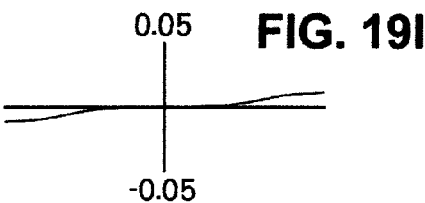
Figure 19E:
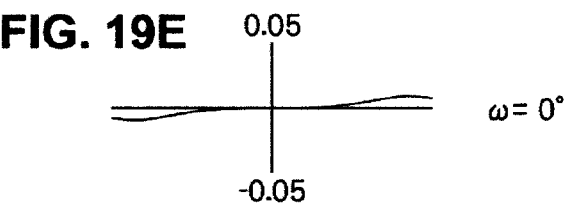
Figure 20A:
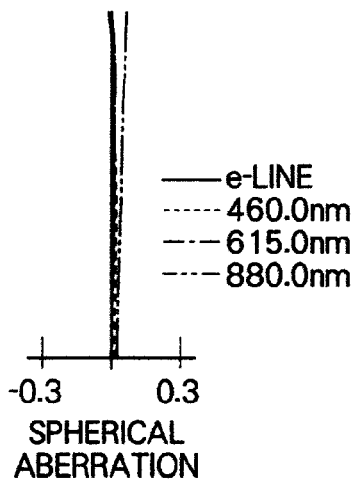
FIGS. 20A through 20F are diagrams illustrating longitudinal aberrations of the variable magnification optical system in Example 4 of the present invention.
Figure 20B:
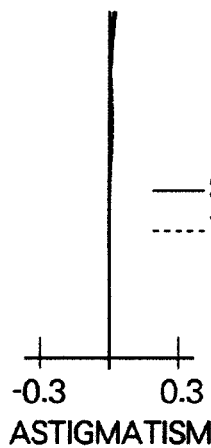
Figure 20C:
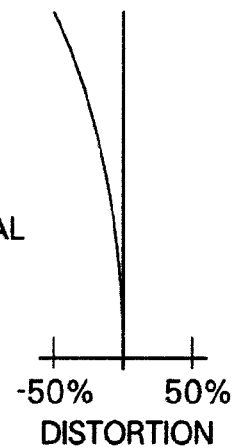
Figure 20D:
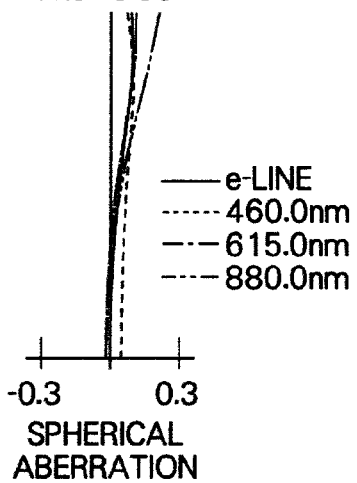
Figure 20E:
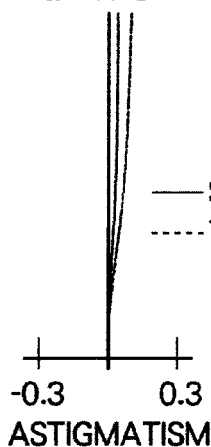
Figure 20F:
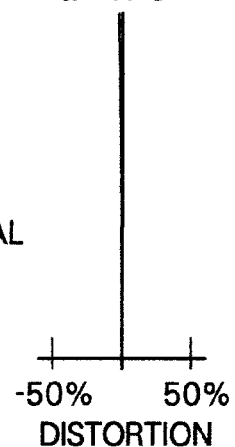
Figure 21E:
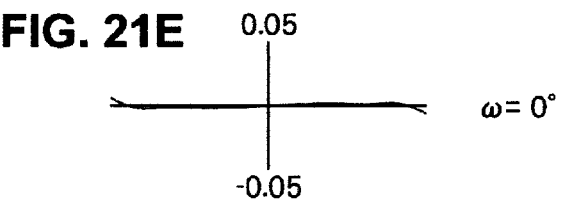
Figure 23A:
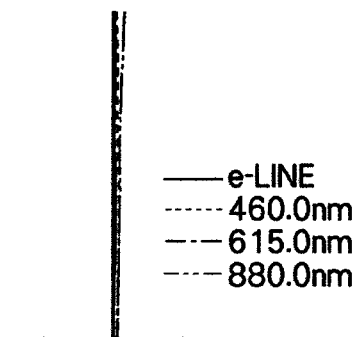
FIGS. 23A through 23F are diagrams illustrating longitudinal aberrations of the variable magnification optical system in Example 5 of the present invention.
Figure 23B:
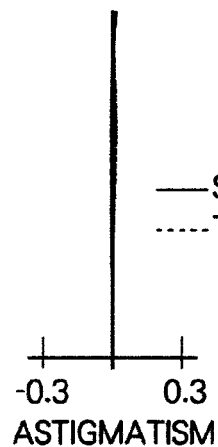
Figure 23C:
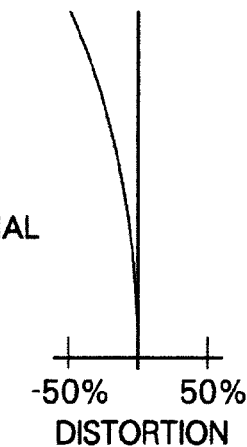
Figure 23D:
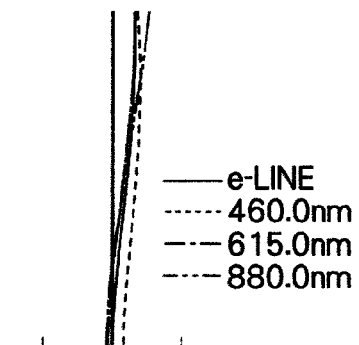
Figure 23E:
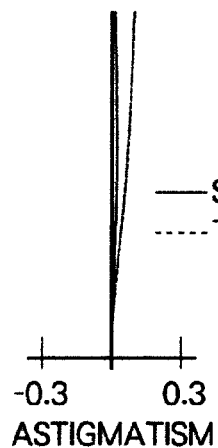
Figure 23F:
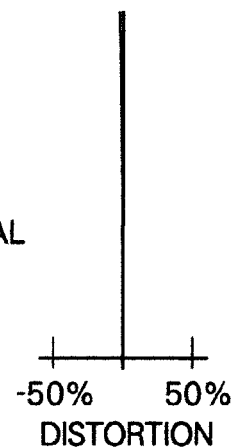
Figure 25A:
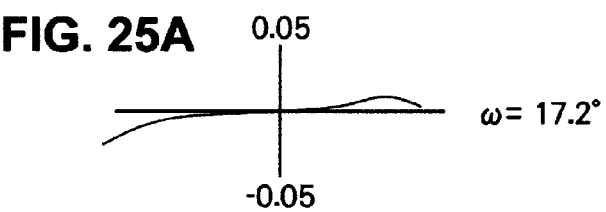
FIGS. 25A through 25I are diagrams illustrating lateral aberrations of the variable magnification optical system in Example 5 of the present invention at tele end.
Figure 25F:
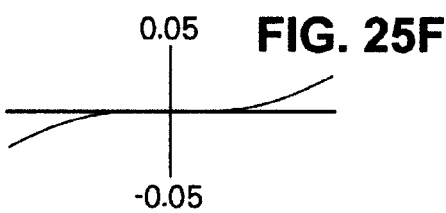
Figure 25B:
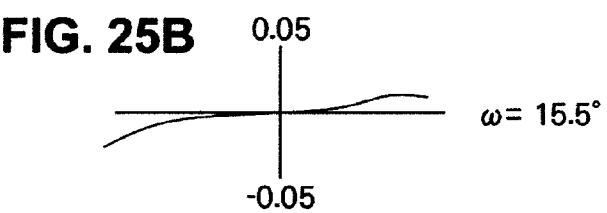
Figure 25G:
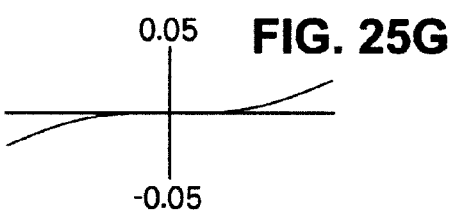
Figure 25C:
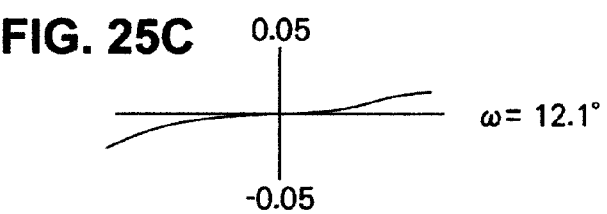
Figure 25H:
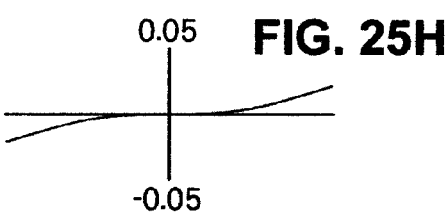
Figure 25D:
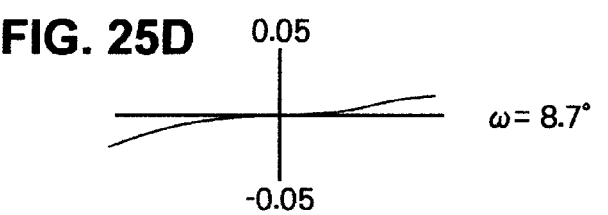
Figure 25I:
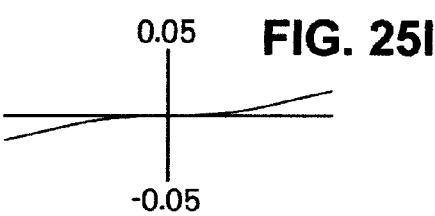
Figure 25E:
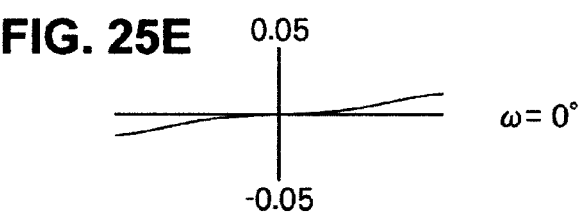
Figure 26A:
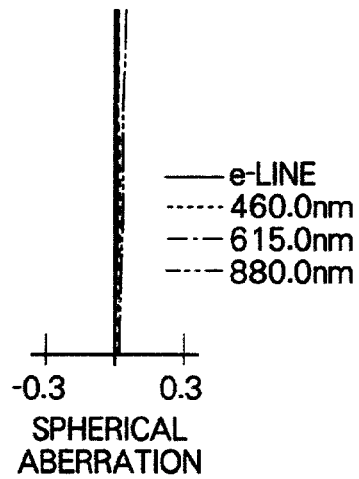
FIGS. 26A through 26F are diagrams illustrating longitudinal aberrations of the variable magnification optical system in Example 6 of the present invention.
Figure 26B:
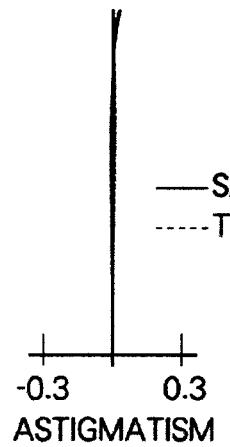
Figure 26C:
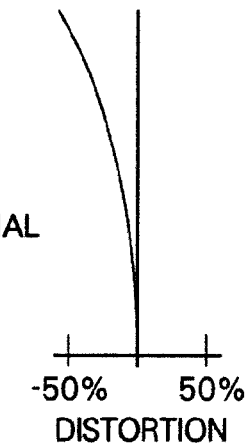
Figure 26D:
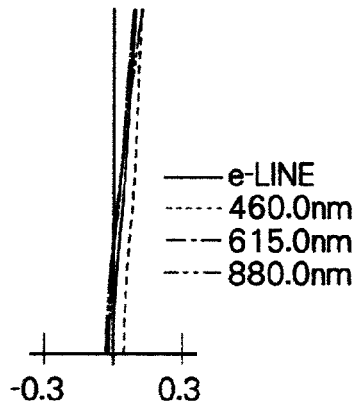
Figure 26E:
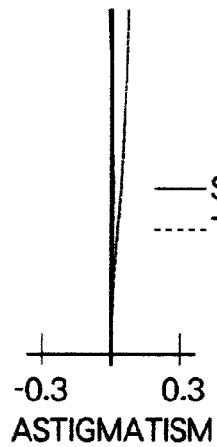
Figure 26F:
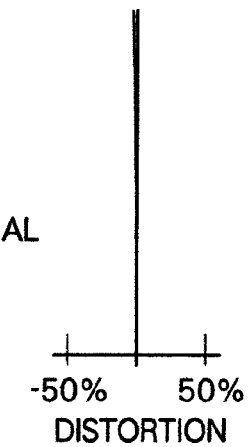
Figure 28A:
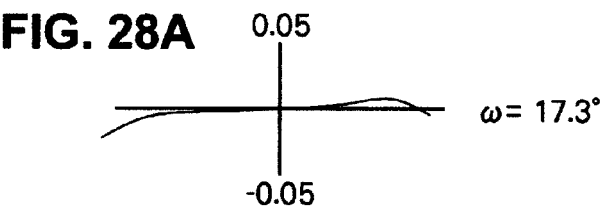
FIGS. 28A through 28I are diagrams illustrating lateral aberrations of the variable magnification optical system in Example 6 of the present invention at tele end.
Figure 28F:
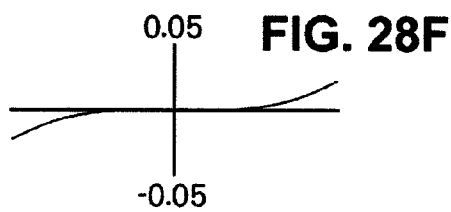
Figure 28B:
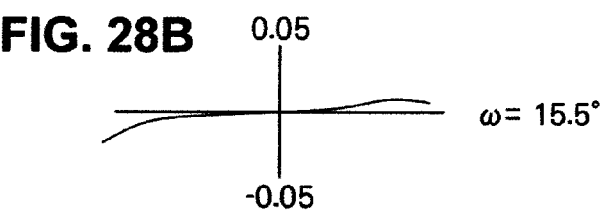
Figure 28G:
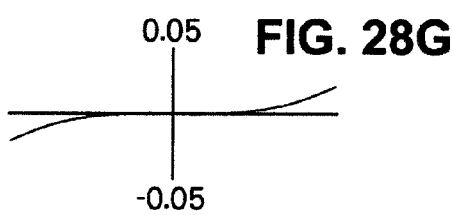
Figure 28C:
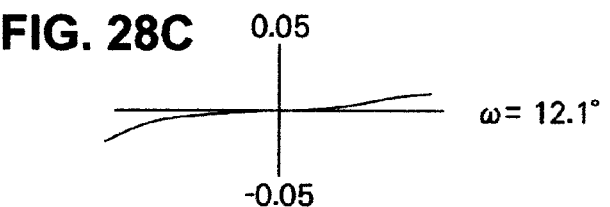
Figure 28H:
Figure 28D:
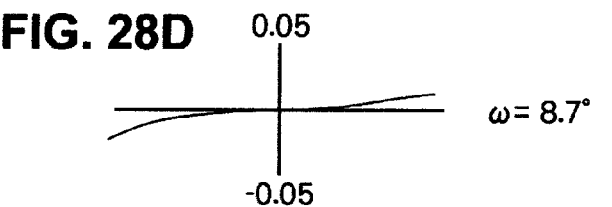
Figure 28I:
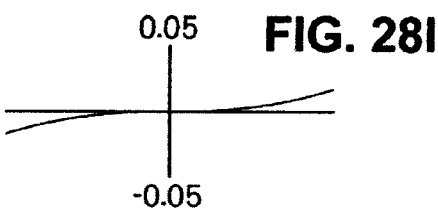
Figure 28E:
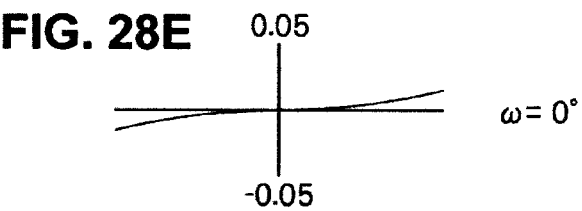
Figure 29A:
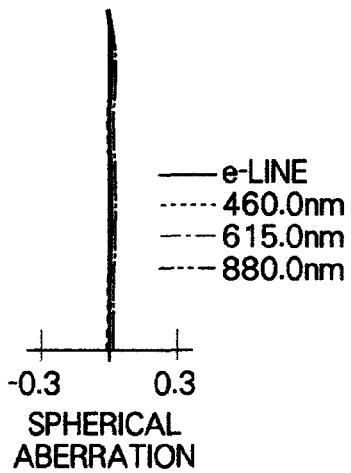
FIGS. 29A through 29F are diagrams illustrating longitudinal aberrations of the variable magnification optical system in Example 7 of the present invention.
Figure 29B:
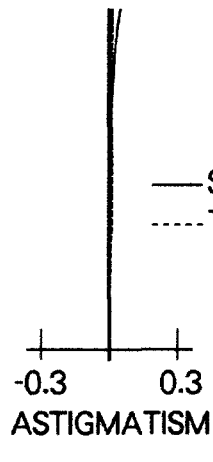
Figure 29C:
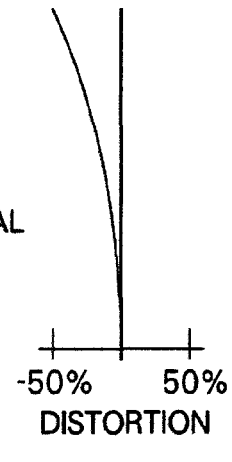
Figure 29D:
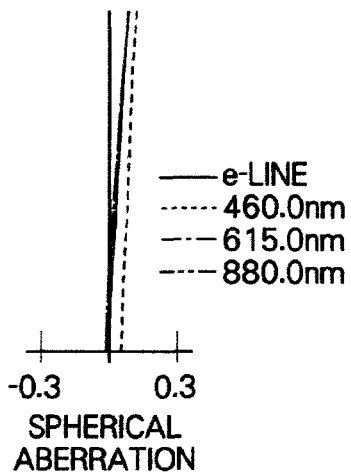
Figure 29E:
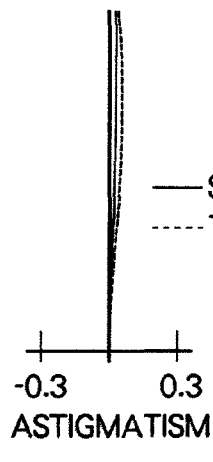
Figure 29F:
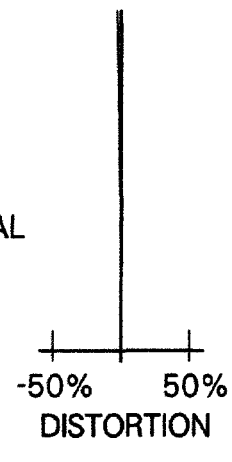
Figure 30E:
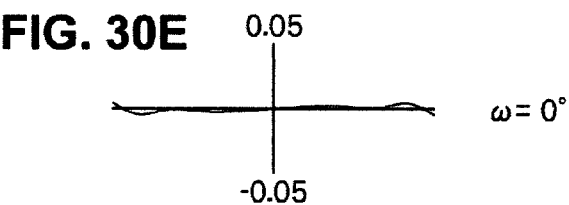
Figure 31E:
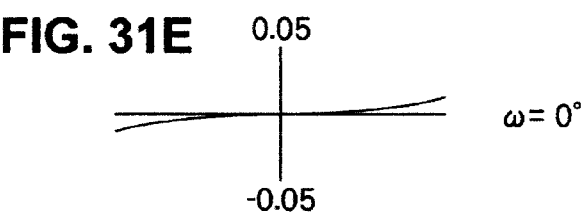

FIGS. 11A through 11F are diagrams illustrating longitudinal aberrations of the variable magnification optical system of Example 1. FIGS. 12A through 12I and 13A through 13I are diagrams illustrating lateral aberrations of the variable magnification optical system of Example 1. FIGS. 11A through 11C illustrate spherical aberration, astigmatism, distortion (distortion aberration) at wide angle end. FIGS. 11D through 11F illustrate spherical aberration, astigmatism, distortion at tele end. FIGS. 12A through 12E illustrate lateral aberrations in a tangential direction for each angle of view at wide angle end. FIGS. 12F through 12I illustrate lateral aberrations in a sagittal direction for each angle of view at wide angle end. In FIGS. 12A through 12I, diagrams for the same half angle of view are arranged next to each other in the horizontal direction. FIGS. 13A through 13E illustrate lateral aberrations in a tangential direction for each angle of view at tele end. FIGS. 13F through 13I illustrate lateral aberrations in a sagittal direction for each angle of view at tele end. In FIGS. 13A through 13I, diagrams for the same half angle of view are arranged next to each other in the horizontal direction. In the diagram illustrating spherical aberration, aberration with respect to e-line is indicated by a solid line, and aberration with respect to the wavelength of 460 nm is indicated by a broken line. Further, aberration with respect to the wavelength of 615 nm is indicated by a dot dashed line, and aberration with respect to the wavelength of 880 nm is indicated by a two-dot dashed line. In the diagram illustrating astigmatism, aberration in the sagittal direction is indicated by a solid line, and aberration in the tangential direction is indicated by a dotted line. In other diagrams illustrating aberration, aberrations with respect to e-line are illustrated. In the diagram illustrating spherical aberration, Fno. represents F-number. In the other diagrams, ω represents half angle of view. Here, in the diagrams illustrating spherical aberration and astigmatism, the unit of scale of the horizontal axis is mm. In the diagrams illustrating lateral aberrations, the unit of scale of the vertical axis is mm. However, in the drawings, illustration of the unit is omitted.

Further, diagrams illustrating aberrations of the variable magnification optical systems of Examples 2 through 7 in a similar manner to the diagrams of Example 1 are in the drawings attached hereto. FIGS. 14A through 14F illustrate longitudinal aberrations of the variable magnification optical system of Example 2. FIGS. 15A through 15I illustrate lateral aberrations at wide angle end. FIGS. 16A through 16I illustrate lateral aberrations at tele end. FIGS. 17A through 17F illustrate longitudinal aberrations of the variable magnification optical system of Example 3. FIGS. 18A through 18I illustrate lateral aberrations at wide angle end. FIGS. 19A through 19I illustrate lateral aberrations at tele end. FIGS. 20A through 20F illustrate longitudinal aberrations of the variable magnification optical system of Example 4. FIGS. 21A through 21I illustrate lateral aberrations at wide angle end. FIGS. 22A through 22I illustrate lateral aberrations at tele end. FIGS. 23A through 23F illustrate longitudinal aberrations of the variable magnification optical system of Example 5. FIGS. 24A through 24I illustrate lateral aberrations at wide angle end. FIGS. 25A through 25I illustrate lateral aberrations at tele end. FIGS. 26A through 26F illustrate longitudinal aberrations of the variable magnification optical system of Example 6. FIGS. 27A through 27I illustrate lateral aberrations at wide angle end. FIGS. 28A through 28I illustrate lateral aberrations at tele end. FIGS. 29A through 29F illustrate longitudinal aberrations of the variable magnification optical system of Example 7. FIGS. 30A through 30I illustrate lateral aberrations at wide angle end. FIGS. 31A through 31I illustrate lateral aberrations at tele end. Note that the diagram illustrating spherical aberration of Example 7 illustrates aberrations with respect to e-line, the wavelength of 460 nm, and the wavelength of 615 nm.

Table 22 shows values corresponding to Formulas (1) through (4) in the variable magnification optical systems of Examples 1 through 7. Table 22 shows values obtained when the reference wavelength is e-line, and a light beam enters based on each specification data as described above.

TABLE 22

| | VALUE CORRESPONDING TO FORMULA | | | |
| --- | --- | --- | --- | --- |
| | (1) Ne4 | (2) (Ra + Rb)/(Ra − Rb) | (3) sag10 − sag7 | (4) sag10/sag7 |
| EXAMPLE 1 | 1.80449 | 9.97 | −0.479 | 2.976 |
| EXAMPLE 2 | 1.81080 | 12.74 | −0.541 | 3.198 |
| EXAMPLE 3 | 1.80414 | 11.73 | −0.536 | 2.874 |
| EXAMPLE 4 | 1.81080 | 16.17 | −0.262 | 4.200 |
| EXAMPLE 5 | 1.80800 | 7.68 | −0.250 | 4.199 |
| EXAMPLE 6 | 1.80800 | 5.01 | −0.169 | 5.785 |
| EXAMPLE 7 | 1.80800 | 227271.00 | −0.175 | 2.884 |

As the data show, all of the variable magnification optical systems of Examples 1 through 7 satisfy the formulas (1) through (4). The structure is compact. Further, while a large aperture ratio, such as the F-number of approximately 1.3 at wide angle end, is maintained, the full angle of view at wide angle end is in the range of 125° to 137°, which is relatively wide. Further, each aberration is corrected in an excellent manner, and the optical performance is high both at wide angle end and at tele end. Further, in the variable magnification optical system of Examples 1 through 6, aberration is corrected in an excellent manner not only in the visible light range but in the near infrared light range.

Figure 32:
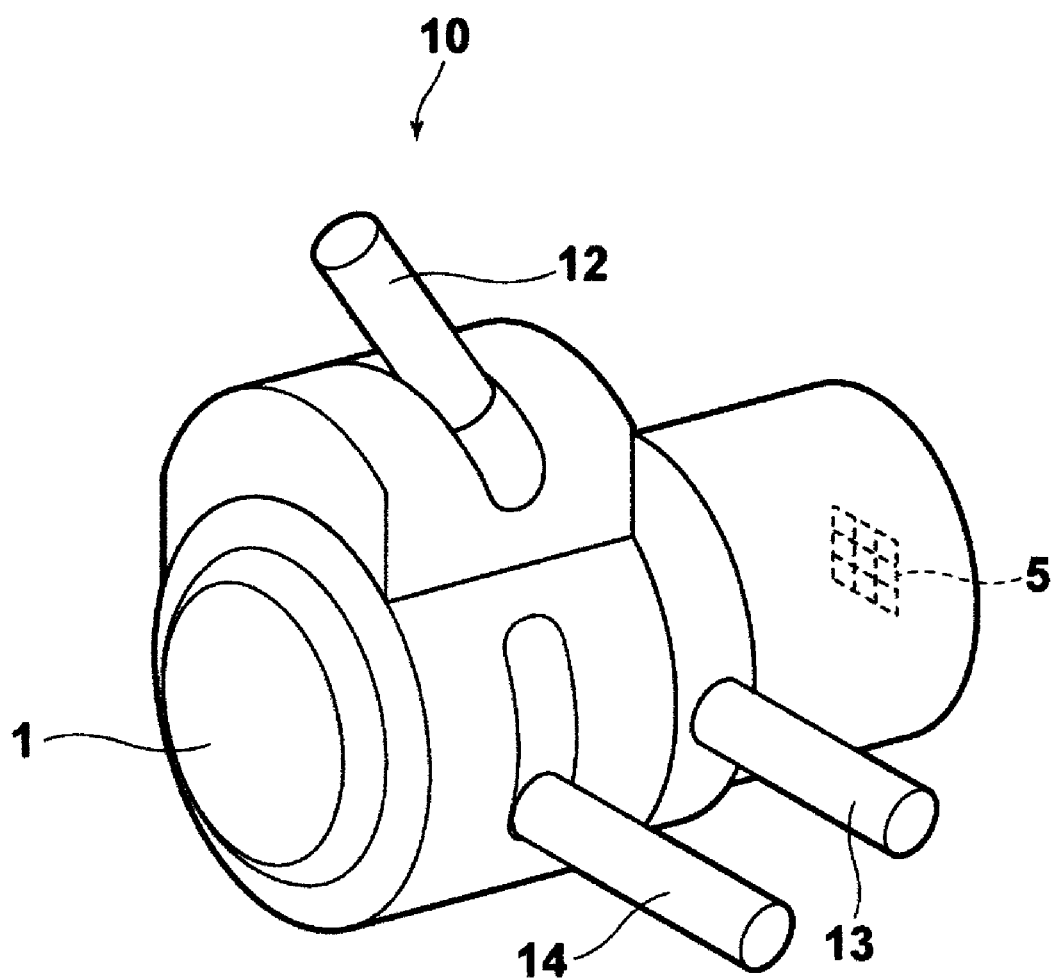
FIG. 32 is a schematic diagram illustrating a perspective view of an imaging apparatus according to an embodiment of the present invention.

FIG. 32 is a schematic diagram illustrating the configuration of a monitor camera according to an embodiment of an imaging apparatus of the present invention. A monitor camera 10 illustrated in FIG. 32 includes the variable magnification optical system 1 according to an embodiment of the present invention and an imaging device 5. The variable magnification optical system 1 is arranged in the inside of a cylinder that is in substantially cylindrical form. The imaging device 5 images an image of a subject formed by the variable magnification optical system 1. Specific examples of the imaging device 5 are CCD, CMOS, and the like, which convert optical images formed by the variable magnification optical system 1 into electric signals. The imaging device 5 is arranged in such a manner that the imaging plane of the imaging device 5 and the image plane of the variable magnification optical system 1 become the same. Further, an aperture lever 12 for changing the diameter of the aperture stop St is provided on the upper side of the cylinder. Further, a zoom lever 13 and a focus lever 14 are provided on the lower side of the cylinder. The zoom lever 13 changes the magnification ratio of the variable magnification optical system 1, and the focus lever 14 adjusts the focus of the variable magnification optical system.

The variable magnification optical system 1 according to the embodiment of the present invention has aforementioned advantageous points. Therefore, the imaging apparatus according to the embodiment of the present invention has excellent compactness. Further, excellent photography (imaging) is possible even under low illumination. Further, it is possible to obtain high quality video images (images) by using a high-resolution imaging device, the resolution of which increased in recent years.

So far, the present invention has been described by using the embodiments and examples. However, the present invention is not limited to the aforementioned embodiments and examples, and various modifications are possible. For example, the values of curvature radius, surface interval, refractive index, Abbe number, and aspheric surface coefficients of each lens element are not limited to the numerical values of the aforementioned examples, and may be other values.

Further, in the embodiment of the imaging apparatus, a case in which the imaging apparatus of the present invention is applied to a monitor camera was described with reference to the drawing. However, the use of the imaging apparatus of the present invention is not limited to the monitor camera. The imaging apparatus of the present invention may be applied, for example, to a video camera, an electronic still camera, and the like.

What is claimed is:

1. A variable magnification optical system comprising:
a first lens group having negative refractive power;
an aperture stop; and
a second lens group having positive refractive power, which are arranged from the object side of the variable magnification optical system,
wherein the magnification of the variable magnification optical system is changed by changing an interval between the first lens group and the second lens group in the direction of an optical axis, and the position of an image plane is corrected by moving the first lens group in the direction of the optical axis when correction of the position of the image plane becomes necessary by changing the magnification, and
wherein a negative lens having a concave surface facing the image side of the variable magnification optical system is arranged on the most object side of the first lens group, and an aspheric lens having a concave surface facing the object side and an aspheric surface facing the image side is arranged on the most image side of the first lens group, and a positive lens having a convex surface facing the image side is arranged, on the object side of the aspheric lens, immediately before the aspheric lens, and
wherein the image-side surface of the aspheric lens includes a portion having higher positive power on the outside of positions through which outermost rays of an axial beam pass, compared with power in a region of the surface of the aspheric lens in the vicinity of the optical axis.

2. A variable magnification optical system, as defined in claim 1, wherein when the refractive index of the aspheric lens in the first group for e-line is Ne4, the following formula (1) is satisfied:

$$Ne4 > 1.75 \tag{1}.$$

3. A variable magnification optical system, as defined in claim 1, wherein the first lens group is a four-lens lens group composed of:
a negative lens having a concave surface facing the image side;
a negative lens having a concave surface facing the image side;
a positive lens having a convex surface facing the image side; and
an aspheric lens having a concave surface facing the object side and an aspheric surface facing the image side, which are sequentially arranged from the object side.

4. A variable magnification optical system, as defined in claim 1, wherein the aperture stop is fixed when the magnification is changed.

5. A variable magnification optical system, as defined in claim 1, wherein when the paraxial curvature radius of the image side surface of the positive lens of the first lens group is Ra, and the paraxial curvature radius of the object side surface of the aspheric lens of the first lens group is Rb, the following formula (2) is satisfied:

$$(Ra+Rb)/(Ra-Rb) > 4.5 \tag{2}.$$

6. A variable magnification optical system, as defined in claim 1, wherein the following formulas (3) and (4) are satisfied with respect to the image side surface of the aspheric lens of the first lens group:

$$sag10 - sag7 < 0 \tag{3}; and$$

$$sag10/sag7 > 2.5 \tag{4}, where$$

sag10: a distance, in the direction of the optical axis, from a point at an outermost position of an effective diameter of the image side surface of the aspheric lens of the first lens group to a plane that passes an intersection between the image side surface of the aspheric lens and the optical axis and is perpendicular to the optical axis, when the variable magnification optical system is set at wide angle end, and sag7: a distance, in the direction of the optical axis, from a point on the image side surface of the aspheric lens, the distance of which from the optical axis is 70% of that of the outermost position of the effective diameter, to the plane that passes the intersection between the image side surface of the aspheric lens and the optical axis and is perpendicular to the optical axis, when the variable magnification optical system is set at wide angle end.

7. An imaging apparatus comprising the variable magnification optical system as defined in claim 1.

* * * * *